United States Patent
Mantravadi et al.

(10) Patent No.: US 8,886,126 B2
(45) Date of Patent: Nov. 11, 2014

(54) RESOLUTION ALGORITHMS FOR MULTI-RADIO COEXISTENCE

(75) Inventors: Ashok Mantravadi, San Diego, CA (US); Tamer A. Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 847 days.

(21) Appl. No.: 12/615,777

(22) Filed: Nov. 10, 2009

(65) Prior Publication Data

US 2011/0009136 A1 Jan. 13, 2011

Related U.S. Application Data

(60) Provisional application No. 61/224,327, filed on Jul. 9, 2009, provisional application No. 61/243,410, filed on Sep. 17, 2009.

(51) Int. Cl.
*H04B 1/00* (2006.01)
(Continued)

(52) U.S. Cl.
CPC .............. *H04W 88/06* (2013.01); *H04W 24/06* (2013.01); *H04W 72/04* (2013.01)
USPC ....... 455/67.11; 455/63.1; 455/522; 370/318; 375/220

(58) Field of Classification Search
CPC . H04W 88/06; H04W 28/0236; H04W 40/16; H04W 52/243; H04W 72/082; H04B 15/02; H04B 2201/709709
USPC .......... 455/423, 501, 522, 63.1, 67.11, 67.13, 455/550.1, 552.1, 553.1, 278.1, 296; 370/318, 332; 375/220
See application file for complete search history.

(56) References Cited

U.S. PATENT DOCUMENTS 6,469,657 B1 * 10/2002 Fox ............................... 342/147
7,072,664 B2 * 7/2006 Luss et al. .................... 455/453
(Continued)

FOREIGN PATENT DOCUMENTS

JP 2007143155 A 6/2007
JP 2009065307 A 3/2009
(Continued)

OTHER PUBLICATIONS

International Search Report and Written Opinion—PCT/US2010/041611, International Search Authority—European Patent Office—Dec. 14, 2010.

(Continued)

*Primary Examiner* — Andrew Wendell
(74) *Attorney, Agent, or Firm* — Rupit M. Patel

(57) ABSTRACT

Systems and methodologies are described herein that facilitate resolution between respective radios associated with a multi-radio wireless device. As described herein, various techniques can be utilized with a multi-radio coexistence manager and/or other suitable mechanisms associated with a wireless device to perform joint resolution for multiple associated radios, thereby providing performance enhancements over conventional piecewise radio resolution schemes. Various exhaustive, decoupled, and progressive radio resolution algorithms are provided herein, by which respective sets of parameters (e.g., transmit powers, interference targets, frequency sub-bands, radio frequency knob settings, etc.) can be selected for respective potentially conflicting radios to enable such radios to operate in coexistence. Further, techniques are provided herein for utilizing a graph theoretic algorithm for progressive radio resolution. In addition, a generic power resolution algorithm can be modified to provide support for multi-transmitter interference mechanisms by employing modifications such as joint power resolution and/or one-pass or iterative interference partitioning.

53 Claims, 16 Drawing Sheets

(51) Int. Cl.
*H04B 15/00* (2006.01)
*H04B 17/00* (2006.01)
*H04B 7/00* (2006.01)
*H04B 7/185* (2006.01)
*H04B 1/38* (2006.01)
*H04L 5/16* (2006.01)
*H04W 88/06* (2009.01)
*H04W 24/06* (2009.01)
*H04W 72/04* (2009.01)

(56) References Cited

U.S. PATENT DOCUMENTS

| | | | |
|---|---|---|---|
| 8,098,782 B2 * | 1/2012 | Chamberlain | 375/350 |
| 8,169,980 B2 | 5/2012 | Dravida et al. | |
| 2003/0099254 A1 | 5/2003 | Richter | |
| 2004/0203727 A1 * | 10/2004 | Abiri et al. | 455/423 |
| 2005/0165919 A1 | 7/2005 | Qian et al. | |
| 2007/0110003 A1 * | 5/2007 | Tujkovic et al. | 370/335 |
| 2007/0206631 A1 | 9/2007 | Parts et al. | |
| 2008/0200195 A1 | 8/2008 | Abe et al. | |
| 2008/0227456 A1 * | 9/2008 | Huang et al. | 455/436 |
| 2008/0279137 A1 | 11/2008 | Pernu et al. | |
| 2008/0311875 A1 * | 12/2008 | Jakonen et al. | 455/295 |
| 2009/0310488 A1 * | 12/2009 | Mighani et al. | 370/235 |
| 2010/0029215 A1 * | 2/2010 | Honkanen et al. | 455/63.3 |
| 2010/0137025 A1 * | 6/2010 | Tal et al. | 455/553.1 |
| 2010/0190520 A1 * | 7/2010 | Reumerman et al. | 455/522 |
| 2011/0105037 A1 * | 5/2011 | Narasimha et al. | 455/63.1 |
| 2012/0213303 A1 * | 8/2012 | Kadous et al. | 375/267 |

FOREIGN PATENT DOCUMENTS

| | | |
|---|---|---|
| JP | 2009515487 A | 4/2009 |
| WO | 2005117473 A1 | 12/2005 |
| WO | 2007008981 A1 | 1/2007 |
| WO | 2007056467 A1 | 5/2007 |
| WO | WO-2009044232 A1 | 4/2009 |

OTHER PUBLICATIONS

Taiwan Search Report—TW099122739—TIPO—Feb. 18, 2013.

* cited by examiner

RESOLUTION ALGORITHMS FOR MULTI-RADIO COEXISTENCE

CROSS-REFERENCE

This application claims the benefit of U.S. Provisional Application Ser. No. 61/224,327, filed Jul. 9, 2009, and entitled "RESOLUTION ALGORITHMS FOR MULTI-RADIO COEXISTENCE," and 61/243,410, filed Sep. 17, 2009, and entitled "RESOLUTION ALGORITHMS FOR MULTI-RADIO COEXISTENCE," the entirety of which is incorporated herein by reference.

BACKGROUND

I. Field

The present disclosure relates generally to wireless communications, and more specifically to managing coexistence between multiple radios utilized by respective devices in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and Single-Carrier FDMA (SC-FDMA) systems.

Generally, a wireless multiple-access communication system can include a number of radios to support communication with different wireless communication systems. Respective radios can operate on certain frequency channels or bands or can have respective predefined requirements. In order to manage communication via multiple radios and avoid collisions and/or interference between respective radios, a coexistence manager (CxM) and/or other means can be utilized to coordinate between respective radios that are in collision (e.g., radios configured such that their mutual operation would cause significant interference on at least one of the radios). To these ends, it would be desirable to implement techniques for enhancing the extent to which a set of potentially conflicting radios associated with a wireless device can operate in coexistence.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a set of radios; identifying sets of candidate parameters for operation of respective identified radios; and selecting respective sets of parameters from identified sets of candidate parameters based on which at least a portion of the identified radios can operate substantially simultaneously.

A second aspect described herein relates to a wireless communications apparatus, which can comprise a memory that stores data relating to a set of potentially conflicting radios. The wireless communications apparatus can further comprise a processor configured to determine candidate operating parameters for respective potentially conflicting radios and to select respective candidate operating parameters based on which at least a portion of the potentially conflicting radios can operate substantially simultaneously.

A third aspect relates to an apparatus, which can comprise means for identifying a plurality of usable radios and respective sets of candidate parameters for operation of the plurality of usable radios and means for selecting parameters for operation of the plurality of usable radios from the respective sets of candidate parameters that enable substantial coexistence between the plurality of usable radios.

A fourth aspect described herein relates to a computer program product, which can include a computer-readable medium that comprises code for causing a computer to identify a set of potentially conflicting radios; code for causing a computer to determine candidate operating parameters for respective potentially conflicting radios; and code for causing a computer to select respective candidate operating parameters based on which at least a portion of the potentially conflicting radios can operate substantially simultaneously.

A fifth aspect described herein relates to an integrated circuit operable to execute a set of machine-executable instructions. The set of machine-executable instructions can comprise identifying a plurality of usable radios and respective sets of candidate parameters for operation of the plurality of usable radios and selecting parameters for operation of the plurality of usable radios from the respective sets of candidate parameters that enable substantial coexistence between the plurality of usable radios.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
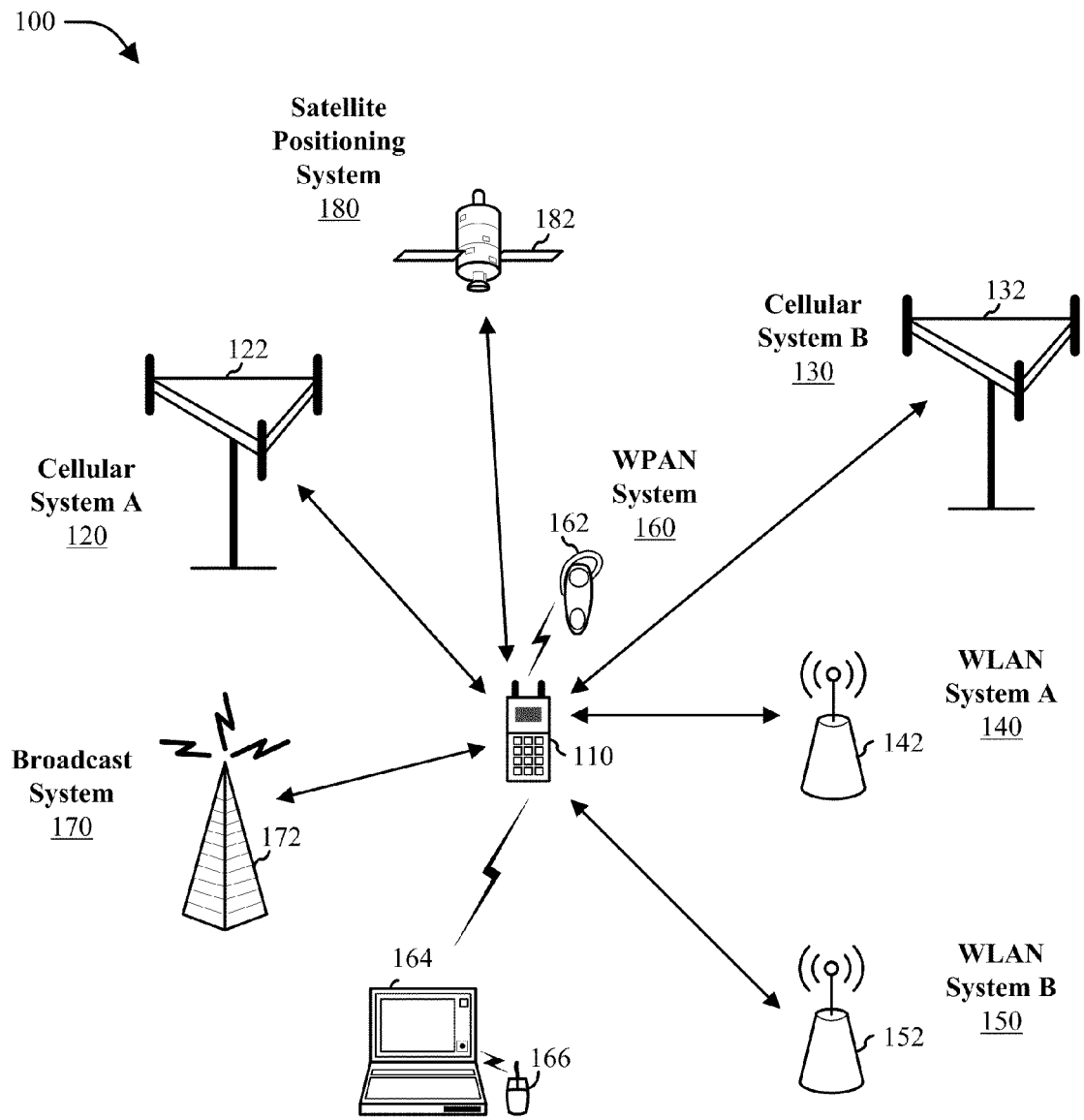
FIG. 1 is a block diagram of an example wireless communication environment in which various aspects described herein can function.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, it can be appreciated that various illustrative logical blocks, modules, circuits, algorithm steps, etc., described in connection with the disclosure herein can be implemented as electronic hardware, computer software, or combinations of both. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the disclosure herein can additionally or alternatively be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, or alternatively the processor can be any conventional processor, controller, microcontroller, state machine, or the like. A processor can also be implemented as a combination of computing devices, e.g., a combination of a DSP and a microprocessor, a plurality of microprocessors, one or more microprocessors in conjunction with a DSP core, or any other such configuration.

Furthermore, various functions of one or more example embodiments described herein can be implemented in hardware, software, firmware, or any combination thereof. If implemented in software, the functions can be stored on or transmitted as one or more instructions or code on a computer-readable medium. Computer-readable media can include both computer storage media and communication media. Communication media can include any medium that facilitates transfer of a computer program from one place to another. Likewise, storage media can include any available media that can be accessed by a general purpose or special purpose computer. By way of example, and not limitation, computer-readable media can comprise RAM, ROM, EEPROM, CD-ROM, digital versatile disc (DVD), blu-ray disc, or other optical disk storage, magnetic disk storage or other magnetic storage devices, and/or any other medium that can be used to carry or store desired program code means in the form of instructions or data structures and that can be accessed by a general-purpose or special-purpose computer or a general-purpose or special-purpose processor. Further, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and/or microwave, then such means are intended to be included in the definition of medium. "Disk" and "disc," as used herein, includes compact disc (CD), laser disc, optical disc, DVD, floppy disk, and blu-ray disc, where "disks" generally reproduce data magnetically while "discs" reproduce data optically (e.g., with lasers). Combinations of the above can also be included within the scope of computer-readable media.

Referring now to the drawings, FIG. 1 illustrates an example wireless communication environment 100 in which various aspects described herein can function. Wireless communication environment 100 can include a wireless device 110, which can be capable of communicating with multiple communication systems. These systems can include, for example, one or more cellular systems 120 and/or 130, one or more wireless local area network (WLAN) systems 140 and/ or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, SC-FDMA, or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, cellular system 120 can include a number of base stations 122, which can support bi-directional communication for wireless devices within their coverage. Similarly, cellular system 130 can include a number of base stations 132 that can support bi-directional communication for wireless devices within their coverage.

WLAN systems 140 and 150 can respectively implement radio technologies such as IEEE 802.11 (Wi-Fi), Hiperlan, etc. WLAN system 140 can include one or more access points 142 that can support bi-directional communication. Similarly, WLAN system 150 can include one or more access points 152 that can support bi-directional communication. WPAN system 160 can implement a radio technology such as Bluetooth, IEEE 802.15, etc. Further, WPAN system 160 can support bi-directional communication for various devices such as wireless device 110, a headset 162, a computer 164, a mouse 166, or the like.

Broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, broadcast system 170 can include one or more broadcast stations 172 that can support one-way communication.

Satellite positioning system 180 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, satellite positioning system 180 can include a number of satellites 182 that transmit signals used for position determination.

In an aspect, wireless device 110 can be stationary or mobile and can also be referred to as a user equipment (UE), a mobile station, a mobile equipment, a terminal, an access terminal, a subscriber unit, a station, etc. Wireless device 110 can be a cellular phone, a personal digital assistant (PDA), a wireless modem, a handheld device, a laptop computer, a cordless phone, a wireless local loop (WLL) station, etc. In addition, wireless device 110 can engage in two-way communication with cellular system 120 and/or 130, WLAN system 140 and/or 150, devices within WPAN system 160, and/or any other suitable system(s) and/or device(s). Wireless device 110 can additionally or alternatively receive signals from broadcast system 170 and/or satellite positioning system 180. In general, it can be appreciated that wireless device 110 can communicate with any number of systems at any given moment.

Figure 2:
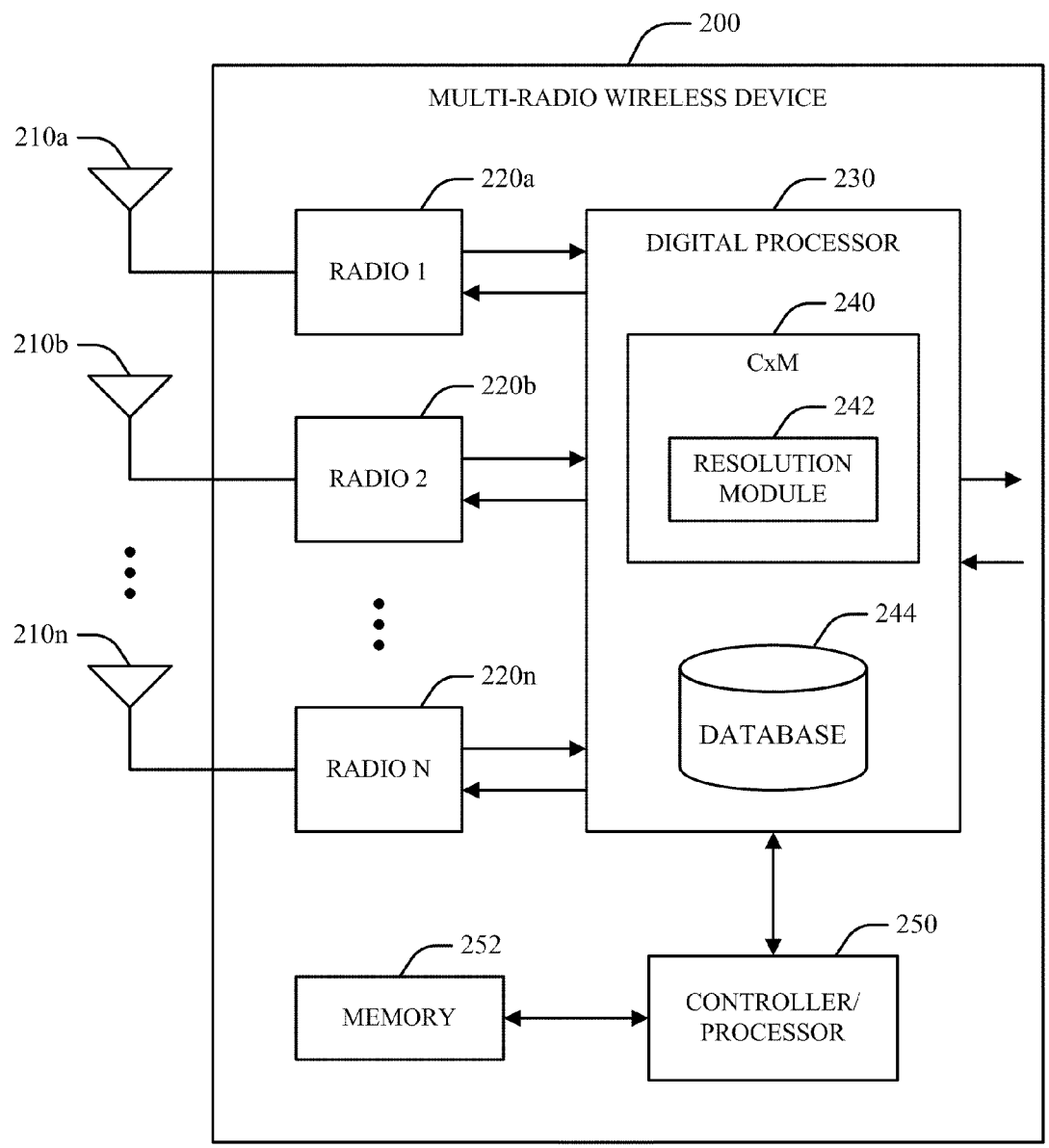
FIG. 2 is a block diagram of an example wireless device that can be operable to manage coexistence between respective radios in an associated wireless communication system in accordance with various aspects.

Turning next to FIG. 2, a block diagram is provided that illustrates an example design for a multi-radio wireless device 200. As FIG. 2 illustrates, wireless device 200 can include N radios 220a through 220n, which can be coupled to N antennas 210a through 210n, respectively, where N can be any integer value. It should be appreciated, however, that respective radios 220 can be coupled to any number of antennas 210 and that multiple radios 220 can also share a given antenna 210.

In general, a radio 220 can be a unit that radiates or emits energy in an electromagnetic spectrum, receives energy in an electromagnetic spectrum, or generates energy that propagates via conductive means. By way of example, a radio 220 can be a unit that transmits a signal to a system or a device or a unit that receives signals from a system or device. Accordingly, it can be appreciated that a radio 220 can be utilized to support wireless communication. In another example, a radio 220 can also be a unit (e.g., a screen on a computer, a circuit board, etc.) that emits noise, which can impact the performance of other radios. Accordingly, it can be further appreciated that a radio 220 can also be a unit that emits noise and interference without supporting wireless communication.

In accordance with one aspect, respective radios 220 can support communication with one or more systems. Multiple radios 220 can additionally or alternatively be used for a given system, e.g., to transmit or receive on different frequency bands (e.g., cellular and PCS bands).

In accordance with another aspect, a digital processor 230 can be coupled to radios 220a through 220n and can perform various functions, such as processing for data being transmitted or received via radios 220. The processing for each radio 220 can be dependent on the radio technology supported by that radio and can include encryption, encoding, modulation, etc., for a transmitter; demodulation, decoding, decryption, etc., for a receiver, or the like. In one example, digital processor 230 can include a coexistence manager (CxM) 240 that can control the operation of radios 220 in order to improve the performance of wireless device 200 as generally described herein. CxM 240 can have access to a database 244, which can store information used to control the operation of radios 220.

For simplicity, digital processor 230 is shown in FIG. 2 as a single processor. However, it should be appreciated that digital processor 230 can comprise any number of processors, controllers, memories, etc. In one example, a controller/processor 250 can direct the operation of various units within wireless device 200. Additionally or alternatively, a memory 252 can be used to store program codes and data for wireless device 200. Digital processor 230, controller/processor 250, and memory 252 can be implemented on one or more integrated circuits (ICs), application specific integrated circuits (ASICs), etc. By way of specific, non-limiting example, digital processor 230 can be implemented on a Mobile Station Modem (MSM) ASIC.

Figure 3:
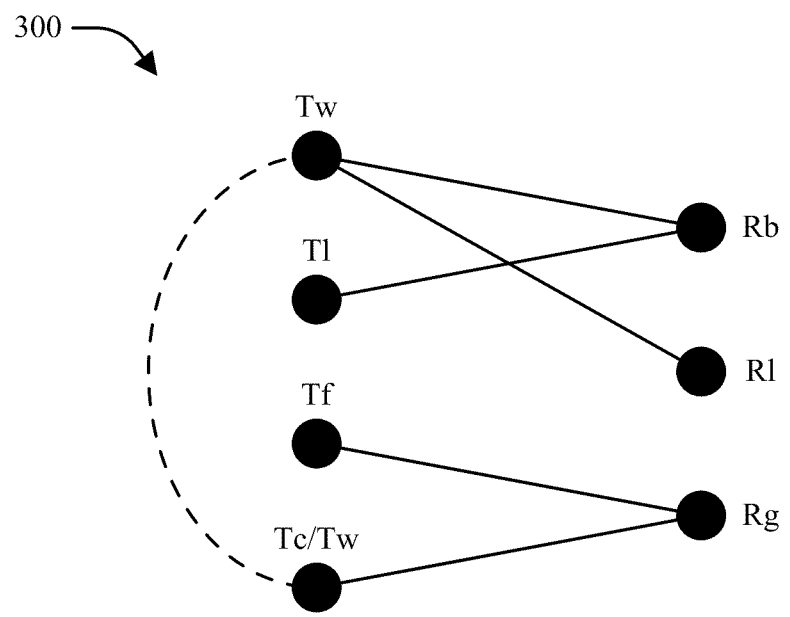
FIG. 3 illustrates an example set of radios that can be implemented in a wireless communication environment and respective potential collisions that can occur among the example set of radios.

In accordance with one aspect, CxM 240 can be utilized to manage operation of respective radios 220 utilized by wireless device 200 in order to avoid interference and/or other performance degradation associated with collisions between respective radios 220. By way of further illustration, graph 300 in FIG. 3 represents respective potential collisions between seven example radios in a given decision period. In the example shown in graph 300, the seven radios include a WLAN transmitter (Tw), an LTE transmitter (T1), an FM transmitter (Tf), a GSM/WCDMA transmitter (Tc), an LTE receiver (R1), a Bluetooth receiver (Rb), and a GPS receiver (Rg). The four transmitters are represented by four nodes on the left side of graph 300, and the three receivers are represented by three nodes on the right side of graph 300. A potential collision between a transmitter and a receiver is represented on graph 300 by a branch connecting the node for the transmitter and the node for the receiver. Accordingly, in the example shown in graph 300, collisions may exist between (1) a WLAN transmitter (Tw) and a Bluetooth receiver (Rb); (2) a LTE transmitter (T1) and a Bluetooth receiver (Rb); (3) a WLAN transmitter (Tw) and a LTE receiver (R1); (4) a FM transmitter (Tf) and a GPS receiver (Rg); and (5) a WLAN transmitter (Tw), a GSM/WCDMA transmitter (Tc), and a GPS receiver (Rg).

In accordance with another aspect, CxM 240 can leverage the functionality of a resolution module 242 in order to allow for the coexistence of radios 220 that could potentially collide and/or otherwise interfere with each other. In one example, resolution module 242 can facilitate enhanced coexistence between respective radios 220 by identifying a set of radio parameters (e.g., power parameters, frequency parameters, radio frequency (RF) block configuration parameters, etc.) that can be utilized for joint coexistence of respective radios 220. By way of specific example, resolution module 242 can utilize one or more progressive algorithms, in which respective compatible parameters for pairs, triplets, and/or other groupings of radios 220 are leveraged to determine a joint resolution. Respective progressive resolutions algorithms that can be utilized by resolution module 242, as well as examples of other resolution algorithms that can be additionally or alternatively utilized by resolution module 242, are described in further detail herein.

Figure 4:
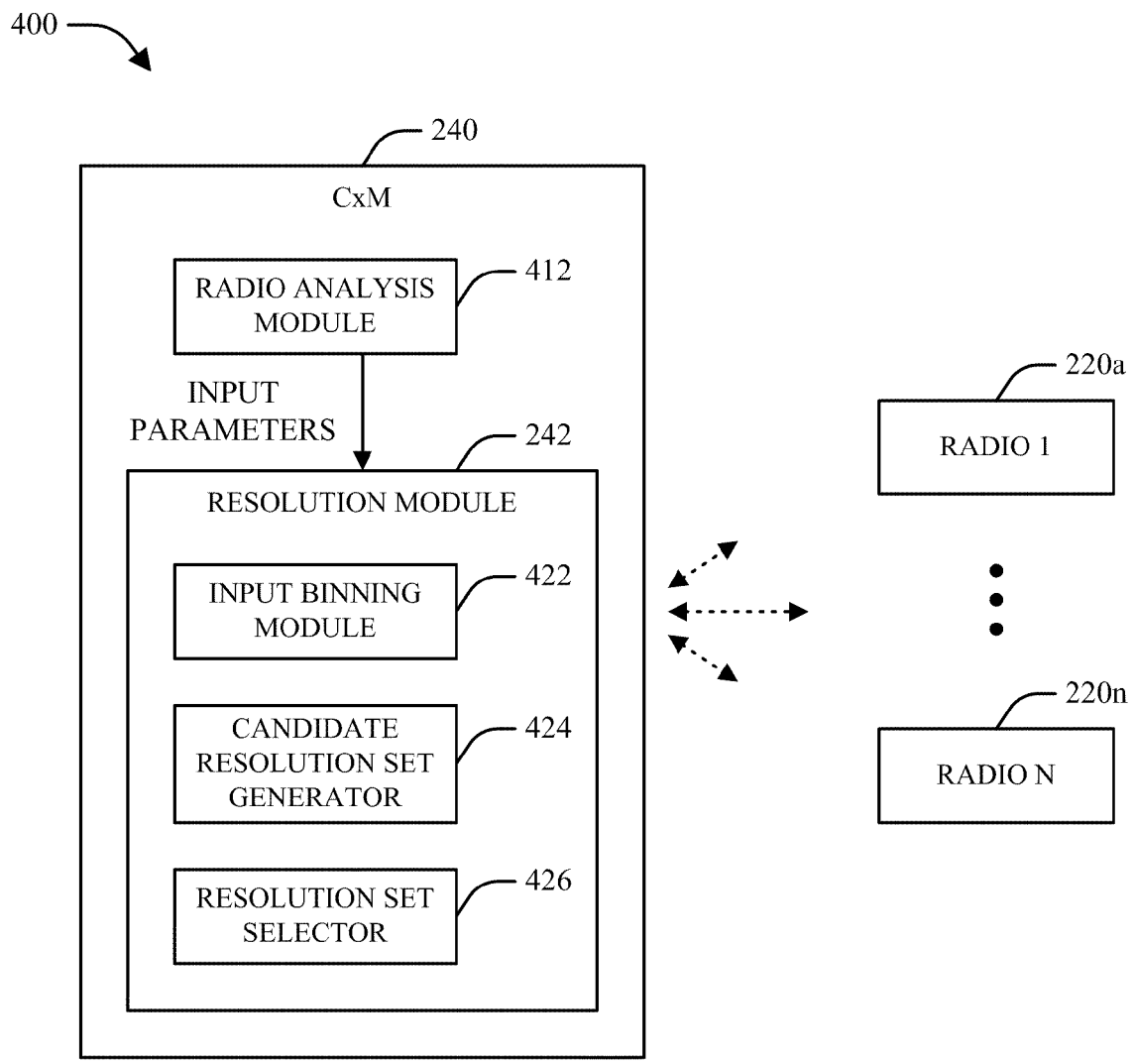
FIGS. 4-5 are block diagrams of respective systems for performing resolution with respect to a set of radios in a wireless communication environment in accordance with various aspects.

Referring next to FIG. 4, a block diagram of a system 400 for performing resolution with respect to a set of radios 220 in a wireless communication environment is illustrated. In accordance with one aspect, system 400 can include a CxM 240, which can be utilized to monitor respective radios 220 (e.g., using a radio analysis module 412) and to determine a joint resolution for the respective radios 220 (e.g., via a resolution module 242) such that coexistence between the respective radios 220 can be achieved. As used herein, "coexistence" between radios generally refers to the ability of respective radios to operate substantially simultaneously. Additionally or alternatively, "coexistence" between radios can refer to the ability of radios to operate substantially simultaneously at a predefined quality level, which can be defined in terms of receiver interference level, acceptable power backoff, and/or any other suitable radio performance metric(s).

As generally described above, resolution module 242 can be utilized by CxM 240 to enable the coexistence of respective radios 220 that could potentially collide or otherwise interfere with each other. For example, when multiple radios 220 (such as, for example, WAN, WLAN, GPS, or the like) are active on a given device, the respective radios 220 can interfere with each other through radiative, conductive, or other interference mechanisms in some cases. Accordingly, resolution module 242 can verify radio coexistence for reported parameters and/or enable coexistence of respective radios 220 by adjusting various parameters of the radios 220, such as parameters in power, frequency, RF Knob configuration, or the like. As used herein and generally in the art, the term "RF Knob" is used to refer to a parameter utilized by respective RF blocks associated with a radio 220 that can in some cases be utilized to aid in coexistence between radios. Examples of RF Knob settings that can be utilized as described herein include, but are not limited to, notch filters, linearity of an associated low noise amplifier (LNA) and/or other amplifier, mixer frequency, and/or any other suitable settings.

In accordance with one aspect, resolution module 242 can utilize various algorithms for joint radio resolution between respective radios 220. Such algorithms can, for example, start from compatible parameters for pairs or triplets of radios 220 and/or any other suitable initial information, based on which a joint resolution can be determined for substantially all associated radios 220 or a subset thereof. It can be appreciated that conventional solutions for multi-radio management have resolved coexistence issues based on a combination of piecewise solutions that respectively operate to allow and disallow specific radios. In contrast, resolution module 242 can perform joint resolution for any suitable number or combination of radios 220, including radios 220 that are merely indirectly impacted by respective managed radio events. Accordingly, it can be appreciated that resolution module 242 can facilitate a highly scalable and radio-independent solution that allows for simultaneous operation of multiple radios 220.

In accordance with one aspect, radio analysis module 412 can determine subsets of potentially conflicting radios 220, as well as identify aggressor and/or victim radios within respective subsets. As used herein, the term "aggressor" refers to any radio that causes interference to another radio, while the term "victim" refers to any radio that observes interference from another radio. While various examples herein are provided with respect to a transmitter radio acting as an aggressor and a receiver radio acting as a victim, it should be appreciated that a transmitter radio, a receiver radio, and/or a combination of radios could serve as either an aggressor or a victim in various scenarios and that any such aggressor/victim configurations can be identified and managed by resolution module 424. Further, it should be appreciated that, unless explicitly stated otherwise, the hereto appended claims are not intended to be limited to any specific identification of aggressor and/or victim radios.

In one example, based on respective interference mechanisms between respective radios 220, as well as an identification of aggressor and/or victim radios in such mechanisms, radio analysis module 412 can identify and/or otherwise obtain input parameters from respective radios 220 and provide such parameters to resolution module 242 for further processing. By way of example, radio analysis module 412 can obtain parameters relating to transmit power, allowable transmit power reduction, frequency sub-bands, and/or other parameters associated with an aggressor radio; acceptable interference level, frequency sub-bands, and/or other parameters associated with a victim radio; and/or any other suitable parameters.

In accordance with one aspect, resolution module 242 can utilize an input binning module 422, a candidate resolution set generator 424, a resolution set selector 426, and/or any other suitable mechanisms in obtaining a joint resolution for respective radios 220. By way of example, such mechanisms and/or other appropriate functionality of resolution module 424 can be implemented using a resolution table and corresponding resolution logic. A resolution table utilized by resolution module 242 can, in one example, be configured based on respective radios 220 as opposed to events within the radios 220.

Various examples of procedures and/or algorithms that can be implemented by resolution module 242 and/or its underlying components, tables, and/or logic are provided in further detail in the following description. While various examples provided herein are described based on an assumption of one event per radio, it should be appreciated that the operation of resolution module 242 as described herein can be extended to multiple events per radio. For example, in the event that multiple simultaneous events (e.g., two or more events) are supported per radio, multiple events from the same radio can be resolved through resolution logic and/or by conducting prioritization and further resolution of subsets as necessary. Such prioritization and resolution is referred to as "priority-based iteration."

In accordance with one aspect, operation of resolution module 242 with respect to a set of radios 220 can commence based on various types of information obtained by radio analysis module 412. This information can include, for example, interference caused at respective victim radios at given aggressor transmit power levels for respective sub-bands of aggressor and victim radios in a given mechanism, maximum transmit powers for maintaining an allowable interference level at a victim radio, RF Knob settings for achieving identified maximum transmit powers, and/or any other suitable parameter(s). In one example, resolution module 242 can utilize various input parameters to construct a resolution table using fields of a fixed bit width (e.g., 3 bits, etc.) for power/interference parameters, sub-band parameters, RF Knob parameters, or the like.

In accordance with another aspect, and as generally set forth in the following description, resolution module 242 can leverage input binning module 422, candidate resolution set generator 424, resolution set generator 426, and/or other suitable means to perform radio resolution in a variety of manners. In a first example, resolution module 242 can utilize an exhaustive approach, wherein input parameters are processed for substantially all combinations of input events to generate outputs for each combination of inputs. Thus, for example, input binning module 422 can initially conduct binning for inputs such as acceptable interference levels for each victim radio, frequency parameters associated with respective radios, and so on. Based on the binned inputs, candidate resolution set generator 424 and/or resolution set selector 426 can obtain output parameters such as maximum transmit powers of respective aggressor radios, frequencies for respective radios, RF Knob settings for respective radios, or the like.

By way of example, an exhaustive approach as described above can be implemented by a software-based resolution module 242 as follows. First, based on input interference levels and frequencies, respective maximum transmit powers can be calculated. Subsequently, the maximum transmit powers can be utilized to find outputs such as more desirable frequencies for respective radios, corresponding transmit power adjustment settings, and/or any other suitable outputs. In one example, input frequency sub-bands for respective aggressor and victim radios can be configured such that sub-bands are not changed unless necessary.

In a second example, resolution module 242 can execute a decoupled approach for radio resolution, wherein inputs such as acceptable interference levels for respective victim radios, frequencies of respective radios, etc., are binned separately by input binning module 422. Based on the binned inputs, output parameters can be obtained in terms of transmit power, frequency, RF Knobs, and/or any other appropriate settings. By way of specific example, decoupled radio resolution can be performed by a software-based resolution module 242 by first finding more desirable sets of frequencies for respective aggressor and/or victim radios if necessary based on binned frequency inputs. Subsequently, based on separately binned interference levels and assuming the modified frequencies, corresponding transmit power parameters can be obtained.

In a third example, resolution module 242 can utilize one or more progressive resolution techniques for obtaining a joint resolution with respect to radios 220. Such techniques can, for example, be implemented as an algorithmic approach starting from individual interference mechanisms, such as interference mechanisms between pairs or triplets of radios or the like. In accordance with one aspect, input binning module 422 at resolution module 242 can initialize progressive resolution by binning respective input parameters for respective radio mechanisms. Input parameters binned at this stage can include, for example, acceptable interference levels for respective victim radios, (e.g., in the case of a one-receiver or one-victim mechanism), sub-bands for respective radios having events that are capable of execution in multiple sub-bands over a hardware time scale, and/or any other suitable parameters. Based on the respective binned inputs, respective outputs can be generated by a candidate resolution set generator 424 and a resolution set selector 426. Generated outputs can include, for example, maximum transmit powers for the aggressor radios for each table entry, RF Knob settings on the aggressor and victim radios for each table entry, or the like.

In a specific, non-limiting example, an example table can be formed for progressive resolution based on a set of two radios 220, a transmitter (Tx) aggressor radio, and a receiver (Rx) victim radio, as shown in Table 1 below:

TABLE 1

Example resolution table for 2-radio mechanisms.

| Rx Interference Level | Tx Frequency | Rx Frequency | Max Tx Power | Tx RF Knob Setting | Rx RF Knob Setting |
|---|---|---|---|---|---|
| ... | ... | ... | ... | ... | ... |
| $I_n$ | $\{F_t\}$ | $\{F_r\}$ | $P_t$ | $RF_t$ | $RF_r$ |
| ... | ... | ... | ... | ... | ... |

As shown in Table 1, receiver interference level, transmitter frequency, and receiver frequency values can be provided as input by input binning module 422, based on which maximum transmit power and transmitter/receiver RF Knob settings can be obtained as output by resolution set selector 426 and/or any other suitable component(s) of resolution module 242.

In another example, resolution module 242 can utilize progressive resolution for scenarios in which multiple aggressor radios act together to interfere with a victim radio (e.g., in the case of TwTcRg as illustrated in diagram 300). Accordingly, resolution module 242 can form an example table for progressive resolution based on three-way relationships between respective radios, as shown below in Table 2:

TABLE 2

Example resolution table for 3-radio mechanisms.

| Rx Interference Level | Tx Frequency | Rx Frequency | Max Tx Power | Tx RF Knob Setting | Rx RF Knob Setting |
|---|---|---|---|---|---|
| ... | ... | ... | ... | ... | ... |
| $I_n$ | $\{F_{t1} \times F_{t2}\}$ | $\{F_r\}$ | $\{P_{t1} \times P_{t2}\}$ | $RF_{t1}, RF_{t2}$ | $RF_r$ |
| ... | ... | ... | ... | ... | ... |

While Table 2 illustrates a specific example involving transmitter aggressor radios and receiver victim radios, it should be appreciated that any suitable 3-radio mechanism could be handled in a similar manner. Further, it should be appreciated that Table 2 could be further expanded in the case of multiple power combinations and/or other similar circumstances. In one example, resolution module 242 can reduce the size of a resolution table for 3-radio mechanisms such as Table 2 and/or a similarly constructed table by limiting storage in the table to specific frequencies deemed problematic.

In accordance with one aspect, resolution module 242 can perform progressive resolution for a set of radios 220 based on a multi-step approach. More particularly, upon binning respective input parameters via input binning module 422, candidate resolution set generator 424 can be utilized by resolution module 242 to generate one or more candidate sets of parameters based on which respective radios 220 would be capable of coexistence. In the event that multiple candidate sets are identified by candidate resolution set generator 424, resolution set selector 426 can be utilized to select one of the candidate sets for use by the respective radios 220. In one example, resolution set selector 426 can select a candidate set of radio parameters in any suitable fashion, such as by employing random selection, utility-based selection based on finding a candidate set that optimizes a cost function (e.g., defined in terms of power consumption, optimal radio performance, or the like), and/or any other suitable selection technique(s).

In accordance with another aspect, candidate resolution set generator 424 can utilize one or more graph-theoretic algorithms for candidate parameter identification. For example, as illustrated by system 500 in FIG. 5, candidate resolution set generator 424 can utilize a graph construction module 512 and/or any other suitable means to graphically represent a set of radios and their corresponding parameters, based on which a graph processing module 514 and/or other means can be utilized to generate respective candidate parameter sets that can be utilized by resolution set selector 426.

Figure 6:
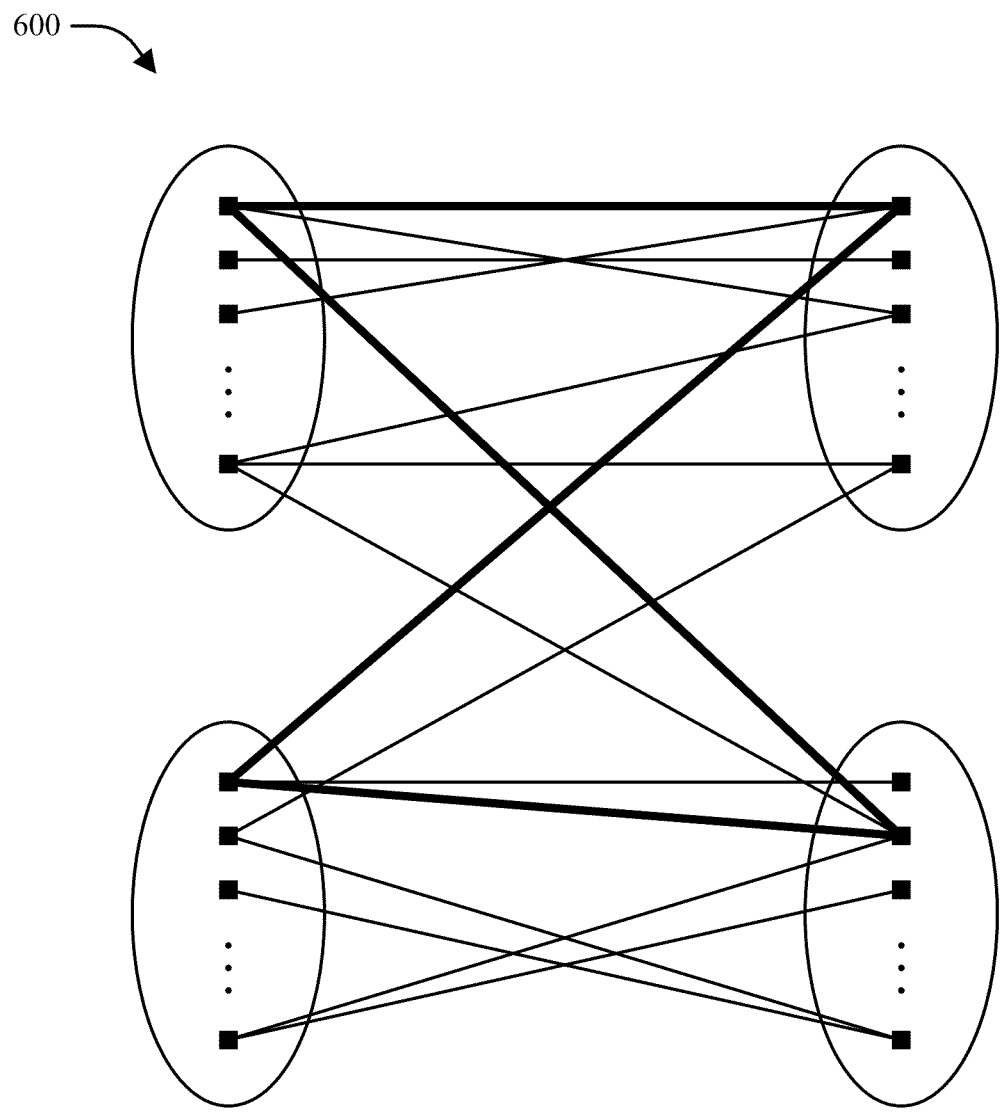
FIGS. 6-8 are graphical illustrations of respective example resolution algorithms that can be utilized to manage coexistence between a set of conflicting radios in accordance with various aspects.

By way of example, graph construction module 512 can form a graphical representation of radio parameters based on pairwise lookup tables as illustrated by diagram 600 in FIG. 6. As illustrated in diagram 500, respective radios can be represented by clusters of nodes. Further, each node in a given cluster can correspond to a combination of allowable parameters for the corresponding radio (e.g., transmit power, transmitter/receiver sub-bands, transmitter/receiver RF Knobs, etc.). As further shown in diagram 500, graph construction module 512 can generate a parameter edge between a pair of nodes if the parameters corresponding to the nodes would result in interference at or below the allowable interference from the corresponding aggressor radio to the corresponding victim radio (e.g., such that the radios can coexist at the corresponding parameters). With respect to diagram 600 and the following illustrations, it should be noted that parameter edges in diagram 600 differ from radio edges as illustrated in diagram 300. In particular, respective parameter edges in diagram 600 correspond to entries in the corresponding lookup table for a given interference level and not RF mechanisms themselves.

In accordance with one aspect, graph processing module 514 can facilitate progressive resolution of respective radios as follows based on a graph such as that illustrated by diagram 600. First, for each aggressor radio, graph processing module 514 can determine if respective nodes have at least one parameter edge to substantially all connected victim radios. If a given node does not have such edges, it is deemed unusable and the node and its parameter edges are removed. In the event that all nodes are deemed unusable by graph processing module 514, candidate resolution set generator 424 can determine that the corresponding radio cluster cannot coexist and initialize prioritization. Otherwise, graph processing module 514 can repeat the above node processing procedure for each victim radio, by checking the usability of respective nodes with their connected aggressor radios. In one example, graph processing module 514 can iteratively perform node processing in this manner until no further parameter edges are removed, at which time a connected set of usable nodes (e.g., one from each radio) can be selected as the resolution by resolution set generator 426. In diagram 600, an example set of usable nodes is illustrated using heavy lines. In another example, in the event that multiple sets of usable nodes are found by candidate resolution set generator 424, resolution set generator 426 can select a set of usable nodes according to a cost function and/or any other suitable selection metric(s).

With regard to the above procedure, it can be appreciated that, as the number of usable parameter edges decreases as the above procedure progresses, the procedure can be guaranteed to converge. Further, if iterated until convergence, it can be appreciated that the order in which respective radios are covered is immaterial. In an additional example, incorporation of a three radio scenario (e.g., TcTwRg) can be handled in a similar manner to that described above by adding additional parameter edges between Tc and Tw.

Figure 7:
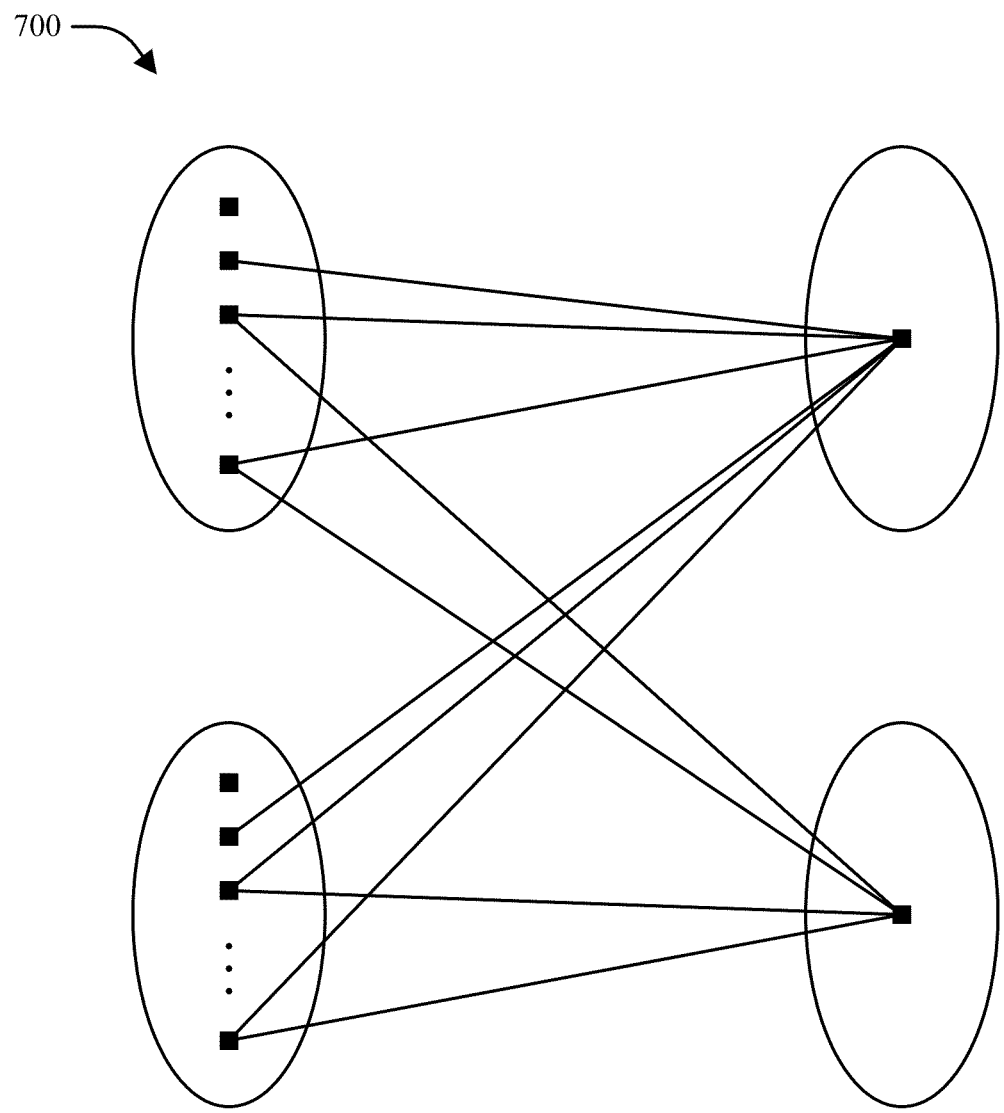

In accordance with another aspect, candidate resolution set generator 424 can implement various instantiations of the generic progressive resolution algorithm described above within a multi-radio environment. As a first example, candidate resolution set generator 424 can utilize progressive power resolution, wherein sub-band changes are disallowed as part of the hardware resolution. An example graph that can be generated by graph construction module 512 and/or processed by graph processing module 514 in connection with a power resolution algorithm is illustrated by diagram 700 in FIG. 7. As shown in diagram 700, respective clusters corresponding to aggressor or transmitter radios can have one or more nodes corresponding to respective transmitter power levels. Further, respective clusters corresponding to victim or receiver radios can be constructed to include a single node corresponding to an interference level reported by the corresponding radio. Accordingly, candidate resolution set generator 424 and/or resolution set generator 426 can perform power resolution under an assumption of no flexibility at the victim/receiver (and, optionally, that RF Knobs can additionally be disregarded).

In one example, based on a graph constructed as shown in diagram 700, power resolution can be performed (e.g., by graph processing module 514 and/or resolution set generator 426) as follows. Initially, for each aggressor/transmitter radio, the maximum transmit power usable by the aggressor radio for each victim/receiver radio connected to the aggressor radio can be determined based on the victim interference level, aggressor and victim sub-bands, and/or other parameters. Based on these determinations, the minimum of the determined maximum transmit powers can be utilized as the power resolution. In one example, if the computed power resolution cannot be supported by respective corresponding radios, prioritization can be performed.

In accordance with one aspect, the power resolution algorithm described above can be utilized to resolve transmitter or aggressor radios independently. However, in the case that two transmitters cause interference to a common receiver, it can be appreciated that the overall transmit powers should be lowered when both transmitters are active due to the additive effects of the transmitters on the interference observed at the receiver. To mitigate these effects, candidate resolution set generator 424 can compensate for joint-transmitter scenarios in various manners. For example, candidate resolution set generator 424 can utilize a joint lookup table for all transmitters and one receiver. Alternatively, interference targets can be reduced (e.g., by an optional interference partitioning module and/or other suitable means) in cases of multiple-transmitter mechanisms.

With regard to the first of the above examples, a joint lookup table can be generated and utilized by candidate resolution set generator 424 for respective receivers and substantially all of their connected transmitters. In addition, such a joint lookup table can be configured to scale with the number of transmitters to a predefined extent. By way of specific example, in the seven radio example shown in diagram 300, three tables could be utilized, e.g., ($R_g$, $T_c T_w T_f$), ($R_b$, $T_w T_1$), and ($R_1$, $T_w$). An example of a joint lookup table that can be structured by candidate resolution set generator 424 is shown below in Table 3:

TABLE 3

Example joint transmitter table design.

| Rx Interference Level | Tx Frequency | Rx Frequency | Max Tx Power | Tx RF Knob Setting | Rx RF Knob Setting |
|---|---|---|---|---|---|
| ... | ... | ... | ... | ... | ... |
| $I_n$ | $\{F_{t1} \times F_{t2} \times \ldots\}$ | $\{F_r\}$ | $\{P_{t1} \times P_{t2} \times \ldots\}$ | $RF_{t1}, RF_{t2}, \ldots$ | $RF_r$ |
| ... | ... | ... | ... | ... | ... |

Figure 8:
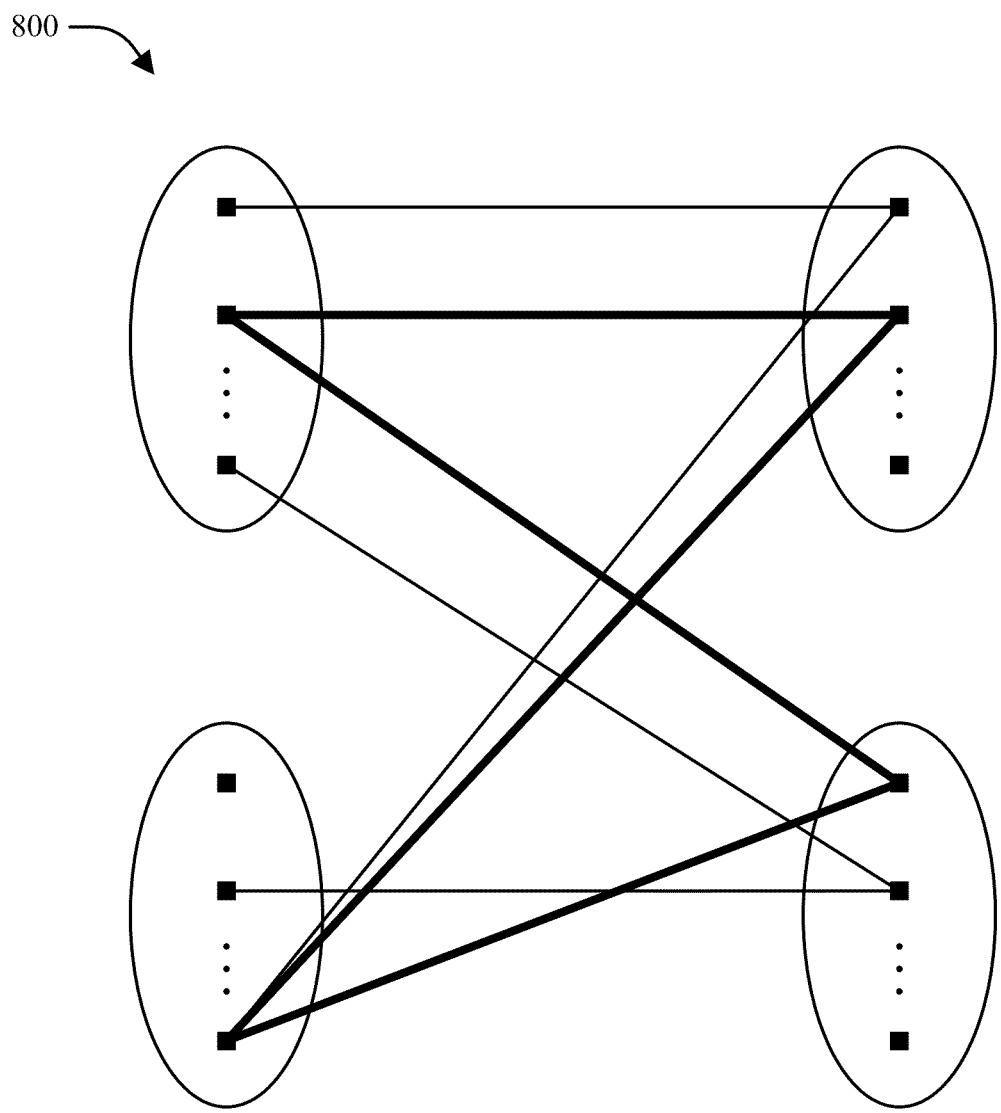

Based on the joint lookup table design shown above in Table 3, the power resolution graph as illustrated by diagram 700 can subsequently be redefined as illustrated by diagram 800 in FIG. 8. As shown in diagram 800, respective nodes in clusters corresponding to receiver/victim radios can correspond to one power combination of the multiple aggressors/transmitters that meet the interference target of the corresponding receiver radio. Further, respective nodes in clusters corresponding to transmitter radios can represent a power level for the corresponding transmitter (which could be, for example, part of multiple power combinations). Based on these definitions, graph construction module 512 and/or graph processing module 514 can operate with respect to the graph illustrated by diagram 800 based on a requirement that each receiver/victim node can only be connected to one transmitter/aggressor node in one transmitter cluster. In one example, based on a graph constructed as shown in diagram 800, the generic progressive resolution algorithm can converge deterministically and yield power combinations that satisfy all receivers. An example set of power combinations that can be obtained by progressive resolution (e.g., via graph processing module 514 and/or resolution set selector 416) is illustrated in diagram 800 by heavy lines.

Figure 9:
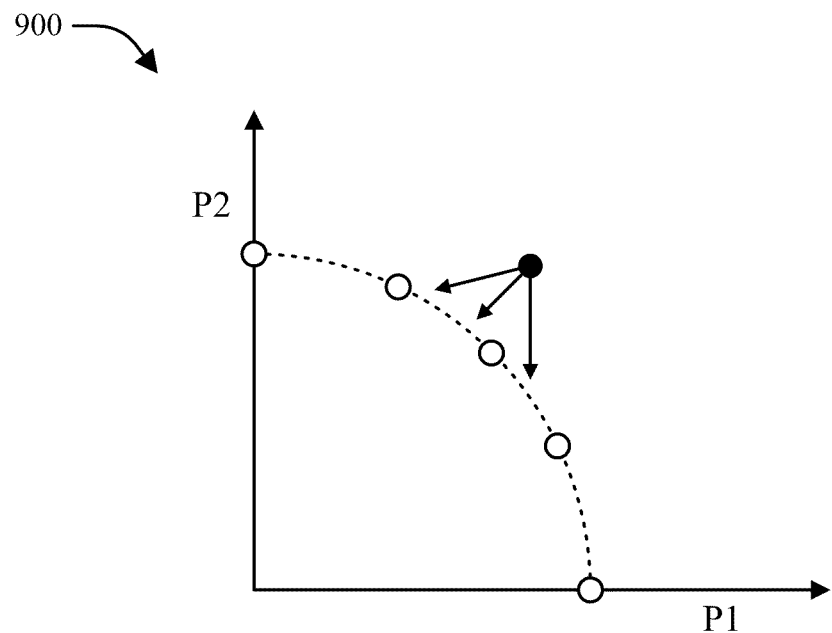
FIG. 9 illustrates an example technique for parameter selection that can be performed with respect to various resolution algorithms described herein.

With regard to the joint power resolution technique described above, it can be appreciated that, aside from scalability, it can be desirable in some cases to pick a working power combination closest to the reported powers of respective radios. For example, as illustrated by diagram 900 in FIG. 9, potential power resolutions that can be obtained for a scenario involving two transmitter radios and one receiver radio are represented by one or more of the white points along the dotted line. Based on such candidate resolutions, it can be determined whether a reported power pair is above the curve given by the candidate resolutions. In the event that back-off is desired, back-off can be facilitated in a variety of manners, such as by using priority-based or minimum distance back-off. In another example, in the event that the allowed region corresponds to a rectangle, the above joint lookup table approach can reduce to a transmitter-decoupled power resolution algorithm.

Returning to FIG. 5 with regard to the interference partitioning example described above, interference partitioning module 516 can account for multiple-transmitter mechanisms by scaling down interference targets associated with respective receivers based on the number of connected transmitters. Interference partitioning as performed by interference partitioning module 516 can, but need not, operate under an assumption of equal partitioning of interference across all connected transmitters.

In one example, interference partitioning can be conducted by interference partitioning module 516 as follows. First, for each transmitter/aggressor radio, a more stringent interference target can be selected than that utilized for standard resolution, based on which a maximum transmit power parameter can be determined Subsequently, the minimum of the maximum transmit powers determined across the transmitter radios can be selected by resolution set selector 426 as the power resolution.

Figure 10:
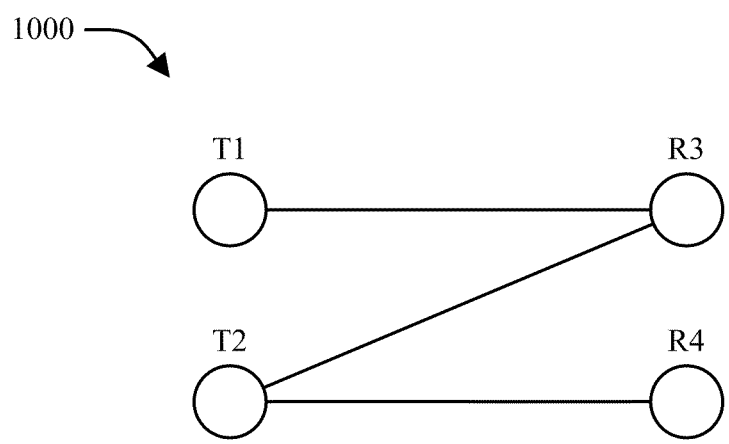
FIG. 10 illustrates respective relationships that can be observed among a set of example radios in connection with an example interference partitioning scheme as described herein.

In another example, respective transmitter radios can be assigned unequal power levels based on radio conditions associated with the transmitter radios. For example, as shown in diagram 1000 in FIG. 10, transmitter radio T2 can be subjected to a transmit power limit by receiver radio R4 that is more stringent than that imposed by receiver radio R3. Accordingly, the power of transmitter radio T1 can be further increased.

In a further example, multiple iterations of interference partitioning can be performed by interference partitioning module 516. For example, an interference partitioning strategy can be fixed by a second iteration if necessary by determining dominant interferers for respective receiver radios based on transmit powers from an initial iteration. Subsequently, interference targets can be updated and transmit powers can be determined with respect to only the dominant interferers in the radio graph.

In accordance with one aspect, the interference partitioning performed for respective receiver radios in the second iteration as described above can utilize a "forward" lookup, wherein a power level is mapped to an interference. Alternatively, respective power parameters determined during the power resolution selection in the first iteration can be compared to the power for a particular transmitter-receiver link, based on which a transmitter can be deemed not to be dominant if the determined power is significantly less than the pairwise power. Accordingly, such transmitters can be removed from consideration when partitioning interference for the corresponding receiver in order to simplify the required computations.

Additionally or alternatively, interference partitioning module 516 can implement a two-stage iterative interference partitioning scheme as follows. Processing can begin in a first stage, wherein for each receiver/victim radio, the number of connected transmitter/aggressor radios are determined, based on which interference is partitioned equally by scaling down interference targets for the receiver radios based on the respective numbers of connected transmitter radios. Additionally, for each transmitter radio, the maximum transmit power of respective receiver radios connected to the transmitter radios is determined based on receiver interference targets, transmitter and/or receiver frequency sub-bands, and/or other suitable parameters. The minimum of the determined maximum transmit powers can then be chosen as an initial power resolution.

Upon completing processing for each transmitter and receiver radio in the first stage, processing can continue to a second iteration. In the second iteration, for each receiver radio, the interference caused by respective transmitter radios connected to the receiver radios is determined based on the initial power resolution. This determined interference can then be partitioned in proportion to the interference caused by the respective transmitter radios. Based on the modified interference targets determined in the second iteration, the transmitter radio processing from the first stage can be repeated to obtain an updated power resolution for the respective radios.

In accordance with another aspect, one or more interference partitioning techniques as performed by interference partitioning module 516 and as described herein can be modified to incorporate support for a set of three-radio mechanisms. By way of reference to diagram 300, TwTc can be handled as a single transmitter that is connected to Rg. When determining power levels in such an example, it can be appreciated that interference scaling need not be performed between Tc and Tw; rather, the closest power combination match can be selected.

Figure 5:
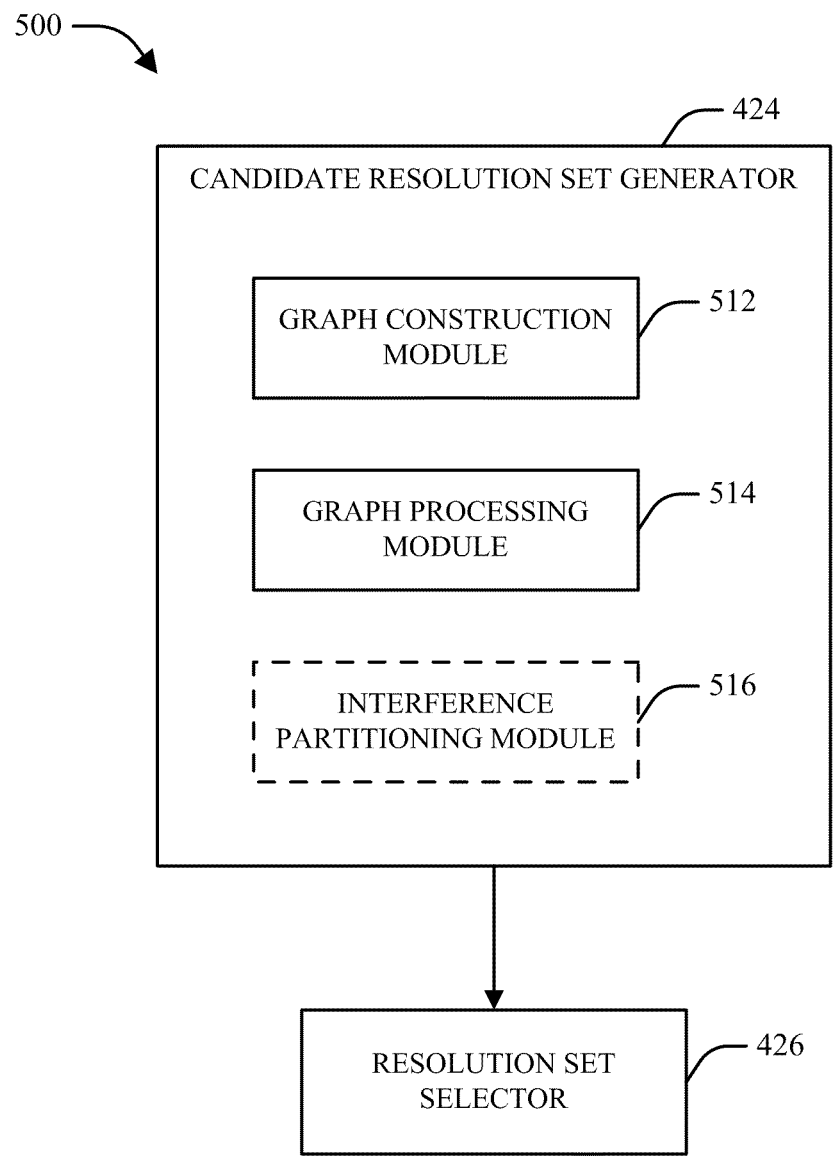

By way of a further example of a resolution technique that can be utilized within system 500 in FIG. 5, candidate resolution set generator 424 and/or resolution set selector 426 can perform RF Knob resolution to conduct multi-radio resolution in a manner similar to the power resolution techniques described above. More particularly, for each edge in a radio graph constructed by graph construction module 512 in the manner generally illustrated by diagram 600, aggressor and victim RF Knob settings can be identified based on corresponding entries in an associated mechanism table. In one example, RF Knobs can utilize 2-bit settings which can be set to, e.g., ON, OFF or DC (Don't Care), where DC={ON, OFF} as allowable settings. Additionally or alternatively, an RF Knob can incorporate an identifier and/or any other suitable information within its settings. In one example, upon identification of RF Knob settings, an RF setting can be selected (e.g., by graph processing module 514 and/or resolution set selector 526) as an intersection of allowable settings corresponding to substantially all edges of the radio graph. If such an intersection results in an empty set, priority-based iteration and/or any other suitable technique(s) can be performed.

With further regard to the RF Knob resolution technique described above, an ON setting corresponding to a first graph edge and an OFF setting corresponding to a second graph edge can be treated as incompatible in an implementation wherein RF Knob conflicts are rare. Alternatively, RF Knob conflicts can be handled by utilizing separate power levels for each RF Knob setting. In another example, RF Knobs can be optimized in a corresponding lookup table in the event that the dependence on power and/or frequency of associated radios is coarse.

By way of an additional example of a resolution technique that can be performed by system 500, decoupled sub-band resolution can be utilized by candidate resolution set generator 424 and/or resolution set selector 426 to facilitate resolution with respect to a set of radios. In one example, sub-band resolution can be performed by analyzing respective sub-band pairs for a given interference level. Thus, graph construction module 512 can generate a resolution graph similar to that illustrated by diagram 600 that includes aggressor and victim parameter nodes corresponding to respective sub-bands (e.g., as opposed to sub-band/power level combinations, as used in the generic graphical configuration described above), wherein a pair of nodes can be connected if the sub-band pair is usable by the corresponding radios (e.g., a power level can be chosen to meet interference targets). In one example, interference partitioning module 516 can be leveraged to define sub-band pair usability based on an interference partitioning approach as generally described above. Upon generation of a suitable parameter graph, a jointly usable sub-band set can be determined (e.g., by graph processing module 514 and/or resolution set selector 526) using generic progressive resolution algorithms as described above and/or by utilizing other suitable algorithm(s).

Figure 11:
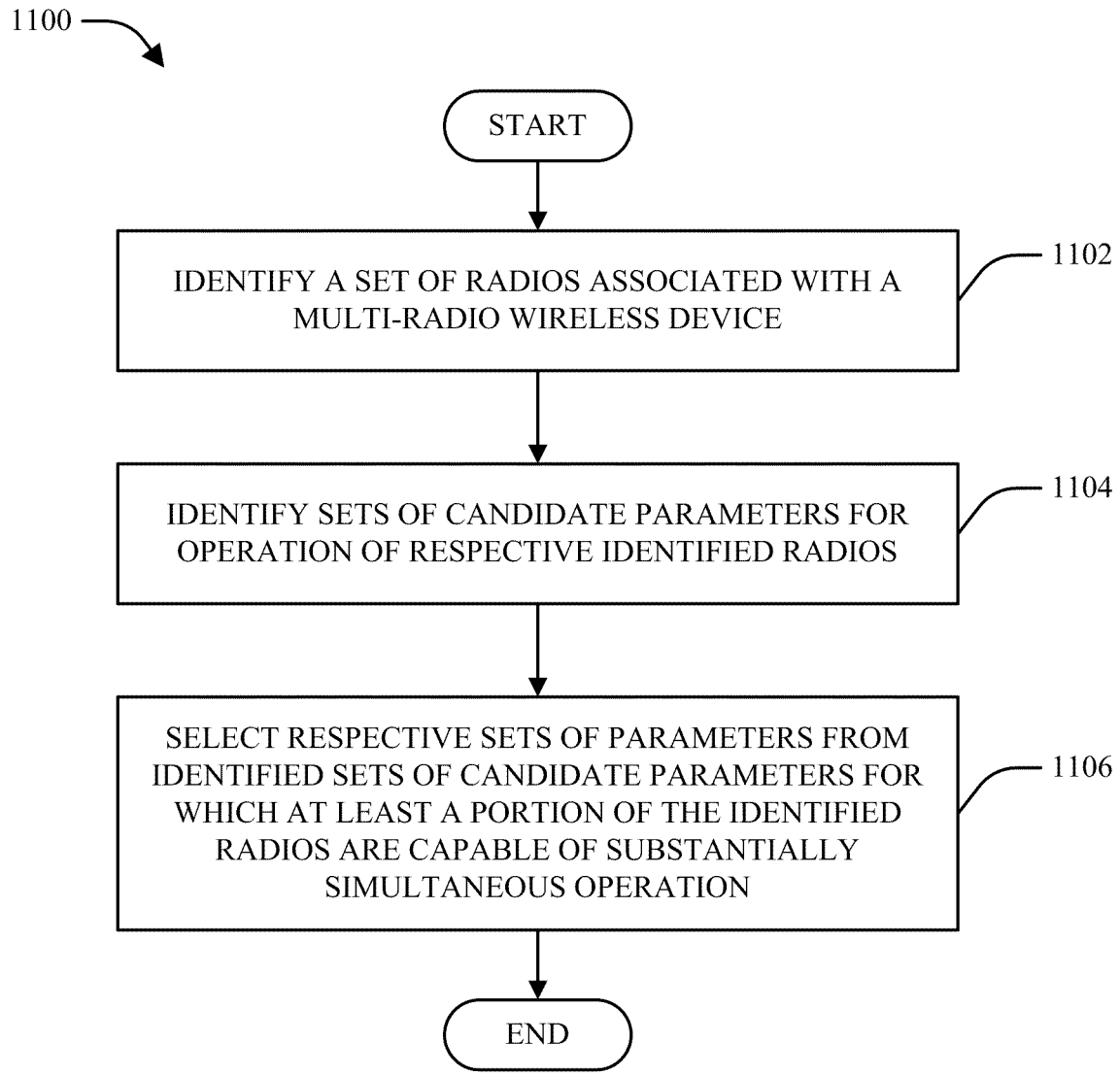
FIGS. 11-13 are flow diagrams of respective methodologies for conducting resolution between a set of conflicting radio technologies.
Figure 12:
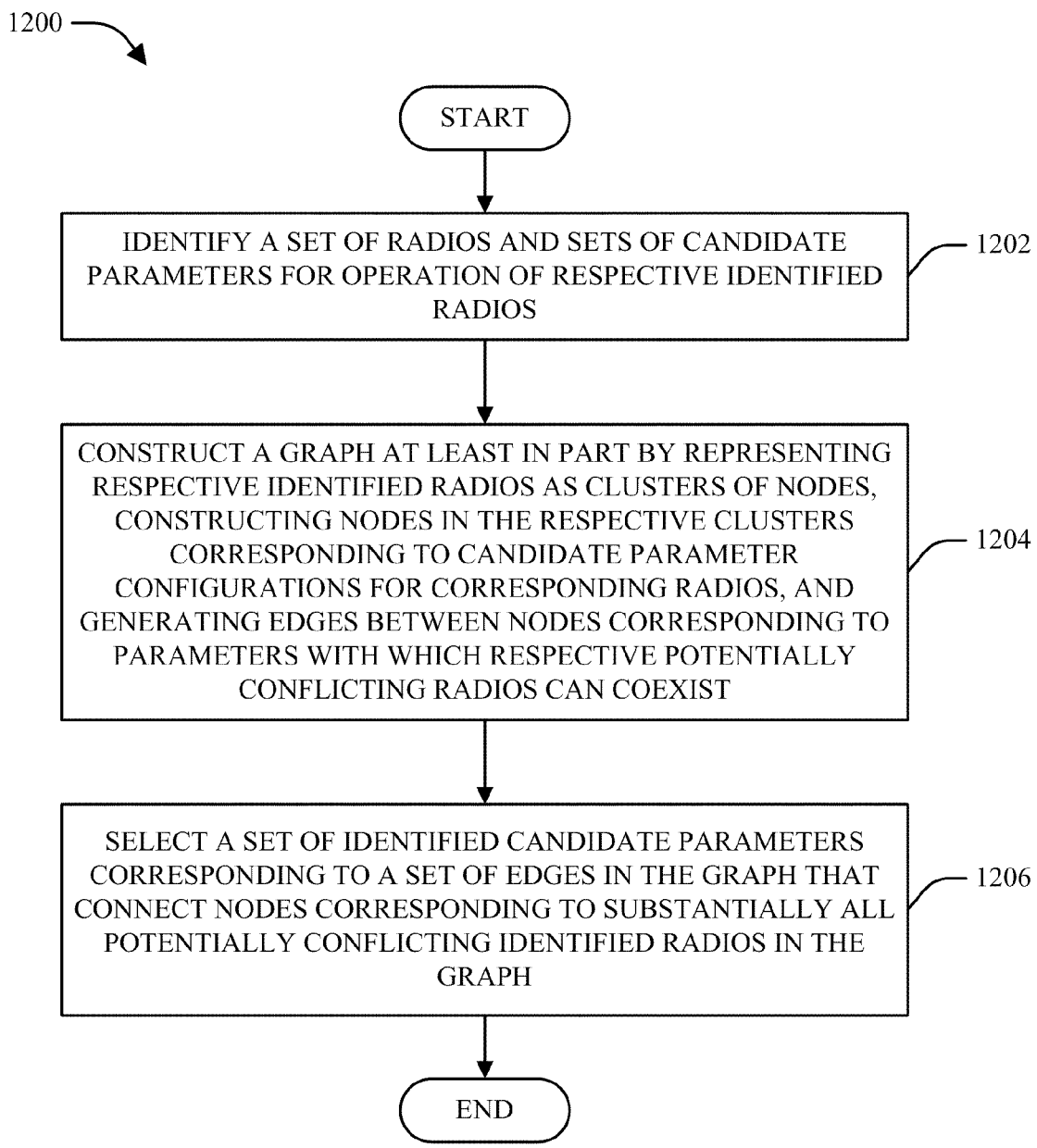
Figure 13:
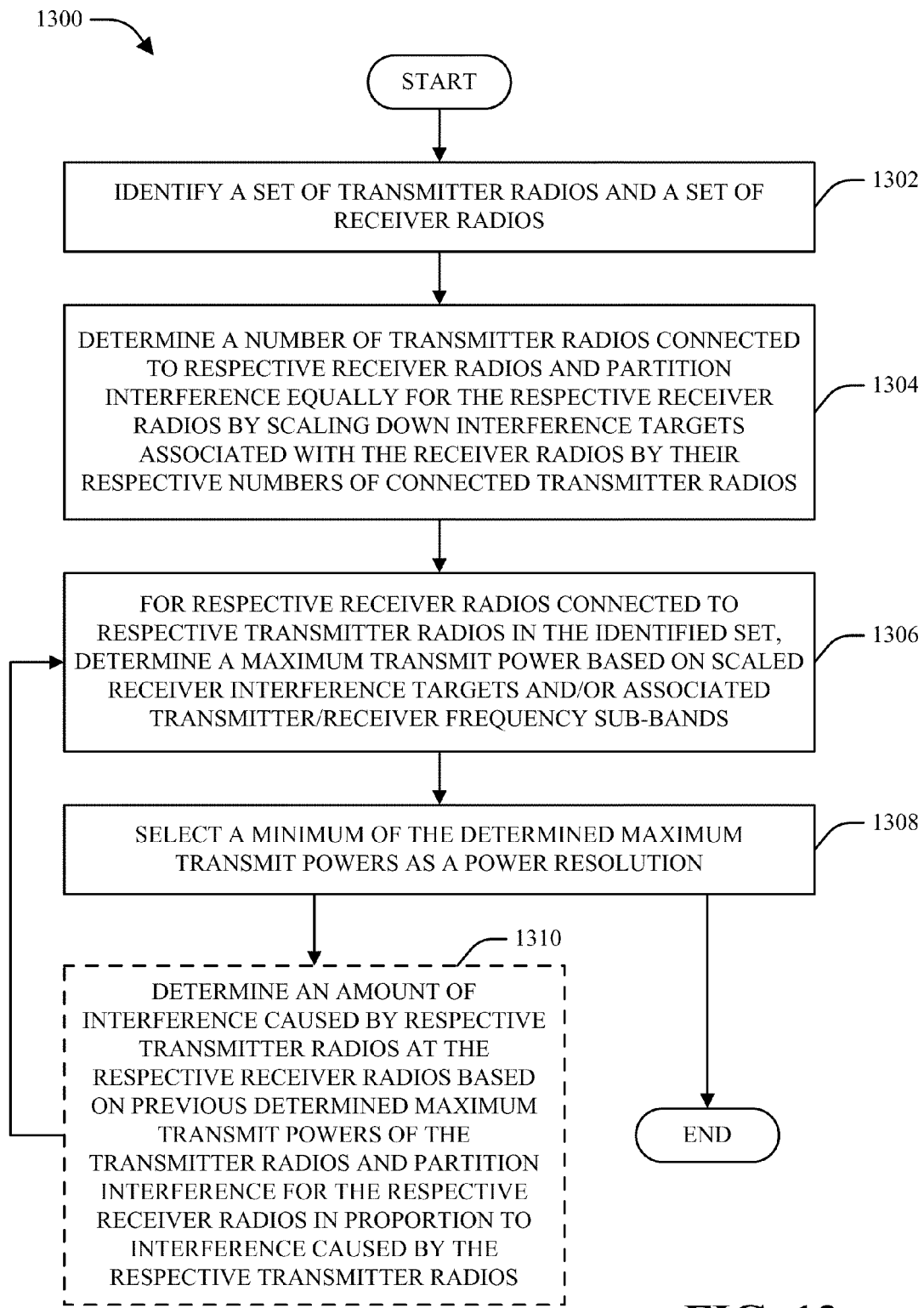

Referring now to FIGS. 11-13, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 11, illustrated is a methodology 1100 for conducting resolution between a set of conflicting radio technologies (e.g., corresponding to radios 220). It is to be appreciated that methodology 1100 can be performed by, for example, a wireless device (e.g., wireless device 110 or 200, via a CxM 240) and/or any other appropriate network device. Methodology 1100 can begin at block 1102, wherein a set of radios associated with a multi-radio wireless device are identified. Next, at block 1104, sets of candidate parameters for operation of respective identified radios are identified (e.g., by a candidate resolution set generator 424 associated with a resolution module 242). Methodology 1100 can then conclude at block 1106, wherein respective sets of parameters are selected (e.g., by a resolution set selector 426) from respective sets of candidate parameters identified at block 1104 for which at least a portion of the radios identified at block 1102 are capable of substantially simultaneous operation.

FIG. 12 illustrates a methodology 1200 for performing resolution for a set of radios based on a graph theoretic approach. Methodology 1200 can be performed by, for example, a wireless terminal and/or any other suitable network entity. Methodology 1200 begins at block 1202, wherein a set of radios and sets of candidate parameters for operation of respective identified radios are identified. Next, at block 1204, a graph is constructed (e.g., by a graph construction module 512) for the radios and parameters identified at block 1202. In one example, a graph can be constructed at block 1204 by representing respective radios identified at block 1202 as clusters of nodes, wherein nodes in the clusters respectively represent candidate parameter configurations for the corresponding radios as identified at block 1202. In accordance with various aspects described herein, parameter configurations corresponding to respective nodes can be defined in terms of transmit power settings, frequency sub-bands, interference target settings, RF Knob settings, and/or any other suitable parameters. Further, edges can be generated at block 1204 between nodes in the graph that correspond to parameters with which corresponding potentially conflicting radios can coexist.

Upon completing the acts described at block 1204, methodology 1200 can conclude at block 1206, wherein a set of candidate parameters identified at block 1202 is selected (e.g., by a graph processing module 514 and/or a resolution set generator 426) that corresponds to a set of edges in the graph constructed at block 1204 that connect nodes corresponding to substantially all potentially conflicting radios represented in the graph. By way of specific example, selection of a set of candidate parameters can be performed at block 1206 by determining whether respective nodes in the graph constructed at block 1204 have at least one parameter edge to substantially all radios that potentially conflict with their respectively corresponding radios, based on which respective nodes determined not to have at least one parameter edge to substantially all radios that potentially conflict with their respectively corresponding radios can be eliminated. Such determinations and eliminations can proceed iteratively until substantially no nodes are capable of being eliminated, at which time a set of candidate parameters can be selected that corresponds to a set of edges in the graph that connect respective remaining nodes.

Referring next to FIG. 13, a methodology 1300 for performing resolution for a set of radios using interference partitioning is illustrated. Methodology 1300 can be performed by, for example, a multi-radio wireless device and/or any other suitable network device. Methodology 1300 can begin at block 1302, wherein a set of transmitter radios and a set of receiver radios are identified. Next, at block 1304, a number of transmitter radios connected to respective receiver radios identified at block 1302 are determined. Based on this determination, interference is equally partitioned at block 1306 (e.g., by an interference partitioning module 516) for the respective receiver radios by scaling down interference targets associated with the receiver radios by their respective numbers of connected transmitter radios.

Upon completing the acts described at block 1304, methodology 1300 can continue to block 1306, wherein, for respective receiver radios connected to respective transmitter radios in the set identified at block 1302, maximum transmit powers are determined based on scaled receiver interference targets computed at block 1304 and/or frequency sub-bands associated with the respective transmitter and/or receiver radios. Subsequently, at block 1308, a minimum of the maximum transmit powers determined at block 1306 is selected as a power resolution.

Upon obtaining a power resolution at block 1308, methodology 1300 can conclude. Alternatively, methodology 1300 can facilitate an iterative interference partitioning technique by proceeding to block 1310, wherein an amount of interference caused by transmitter radios connected to respective receiver radios is determined based on the maximum transmit powers of the transmitter radios as determined at block 1306, based on which interference can be partitioned for the respective receiver radios in proportion to the interference caused by the respective transmitter radios. Upon completing the acts described at block 1310, methodology 1300 can repeat the acts described at block 1306-1308 to obtain an updated power resolution. Upon obtaining an updated power resolution, methodology 1300 can conclude or can again return to block 1310 for further iterative refinement to the power resolution.

Figure 14:
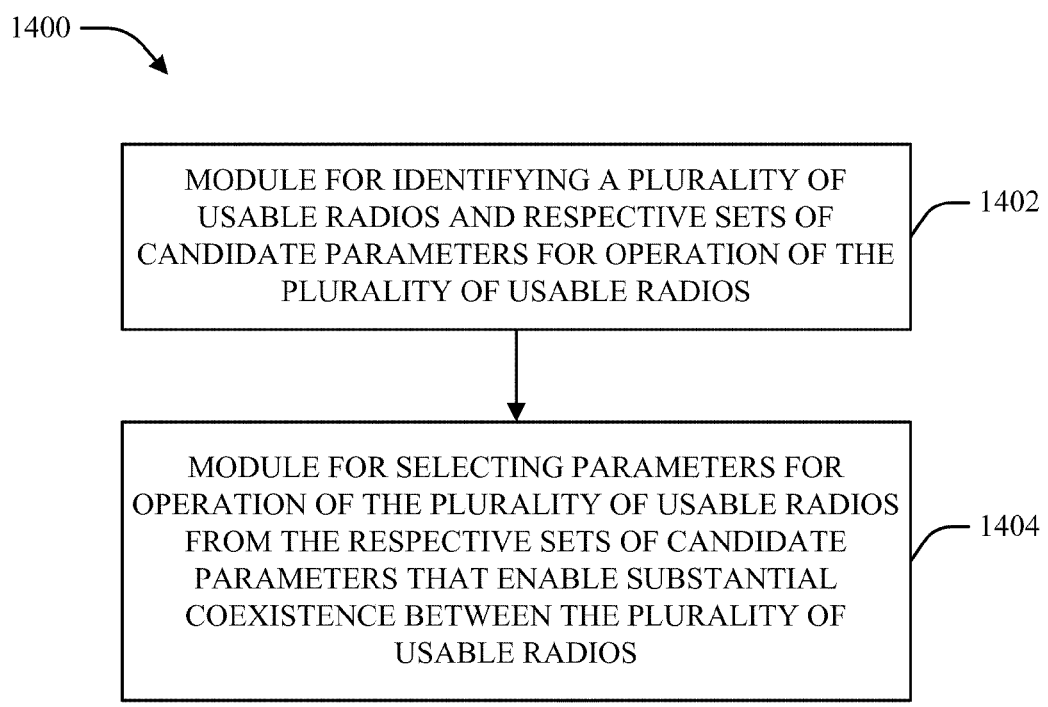
FIG. 14 is a block diagram of an apparatus that facilitates resolution of operating parameters for various radios associated with a multi-radio wireless terminal.

Referring next to FIG. 14, an apparatus 1400 that facilitates resolution of operating parameters for various radios (e.g., radios 220) associated with a multi-radio wireless terminal (e.g., wireless device 110 or 200) is illustrated. It is to be appreciated that apparatus 1400 are represented as including functional blocks, which can be functional blocks that represent functions implemented by a processor, software, or combination thereof (e.g., firmware). Apparatus 1400 can be implemented by a wireless device (e.g., via a CxM 240) and/or another suitable network entity and can include a module 1402 for identifying a plurality of usable radios and respective sets of candidate parameters for operation of the plurality of usable radios and a module 1404 for selecting parameters for operation of the plurality of usable radios from the respective sets of candidate parameters that enable substantial coexistence between the plurality of usable radios.

Figure 15:
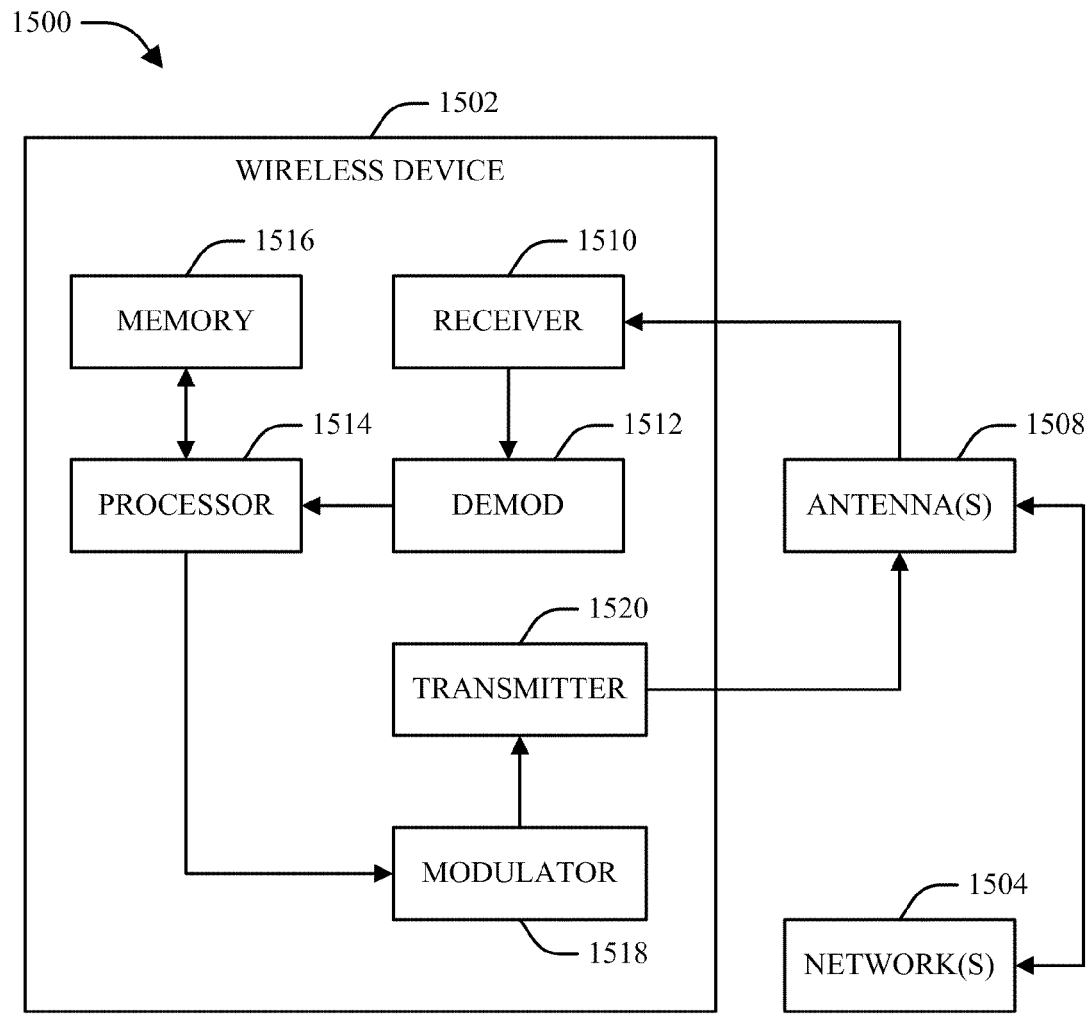
FIG. 15 is a block diagram of a wireless communications device that can be utilized to implement various aspects described herein.

FIG. 15 is a block diagram of a system 1500 that can be utilized to implement various aspects of the functionality described herein. In one example, system 1500 includes a wireless device 1502. As illustrated, wireless device 1502 can receive signal(s) from one or more networks 1504 and transmit to the one or more networks 1504 via one or more antennas 1508. Additionally, wireless device 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to terminal 1502. Additionally, wireless device 1502 can employ processor 1514 to perform methodologies 1000-1200 and/or other similar and appropriate methodologies. Wireless device 1502 can also include a modulator 1518 that can multiplex a signal for transmission by a transmitter 1520 through antenna(s) 1508.

Figure 16:
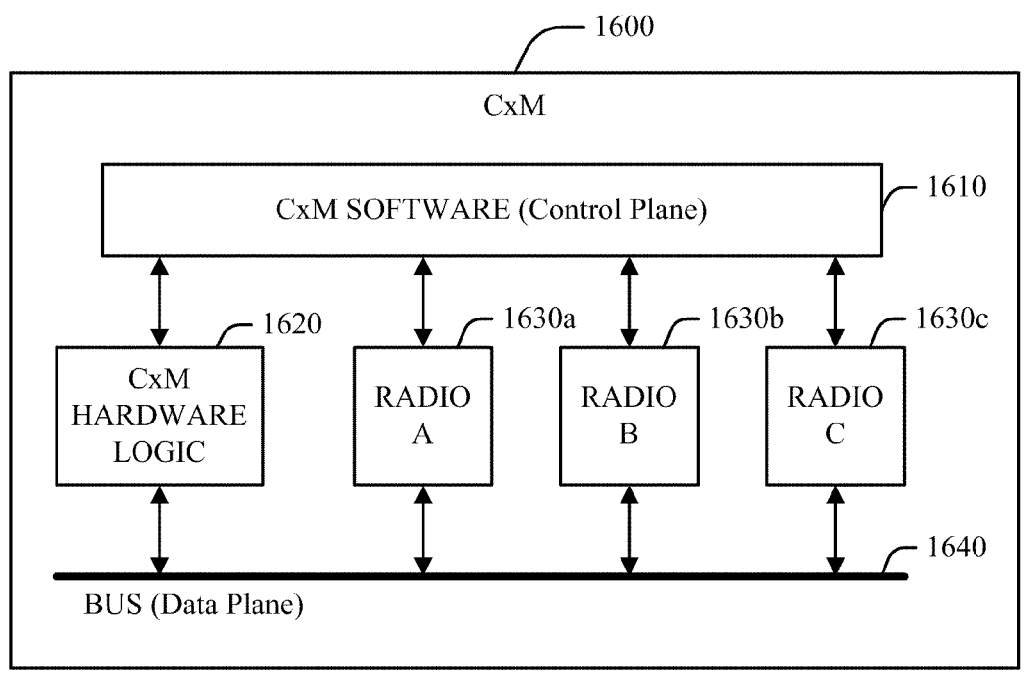
FIGS. 16-17 are block diagrams that illustrate respective aspects of an example coexistence manager that can be utilized to implement various aspects described herein.

Turning next to FIG. 16, an example implementation of a CxM 1600 that can be utilized to implement various aspects described herein is illustrated. In one example, if multiple radios that can potentially interfere with each other are utilized in a wireless communication system, CxM 1600 can be used to coordinate the respective radios. In one example, CxM 1600 can be implemented as a mixture of software and hardware by utilizing, for example, control plane CxM software 1610 and CxM hardware logic 1620.

In accordance with one aspect, CxM 1600 can be implemented as a centralized architecture such that respective radios 1630*a*-1630*c* can coordinate and/or send notifications to CxM hardware logic 1620, which can in turn send notifications back to respective radios 1630*a*-1630*c*. In another example, operation of CxM 1600 can be split into hardware and software to accommodate time scales associated with coexistence issues. For example, radios 1630*a*-1630*c* can provide notifications of an imminent radio event at a substantially fast time scale (e.g., on the order of 100-150 microseconds), and accordingly CxM hardware logic 1620 and/or a data plane bus 1640 between CxM hardware logic 1620 and radios 1630*a*-1630*c* can be utilized to accommodate expedient operation based on notifications. Additionally or alternatively, CxM software 1610 can be implemented in the control plane to facilitate operations that can occur on a slower time scale, such as coordination radios coming on or off, sleep mode operation, or the like.

Figure 17:
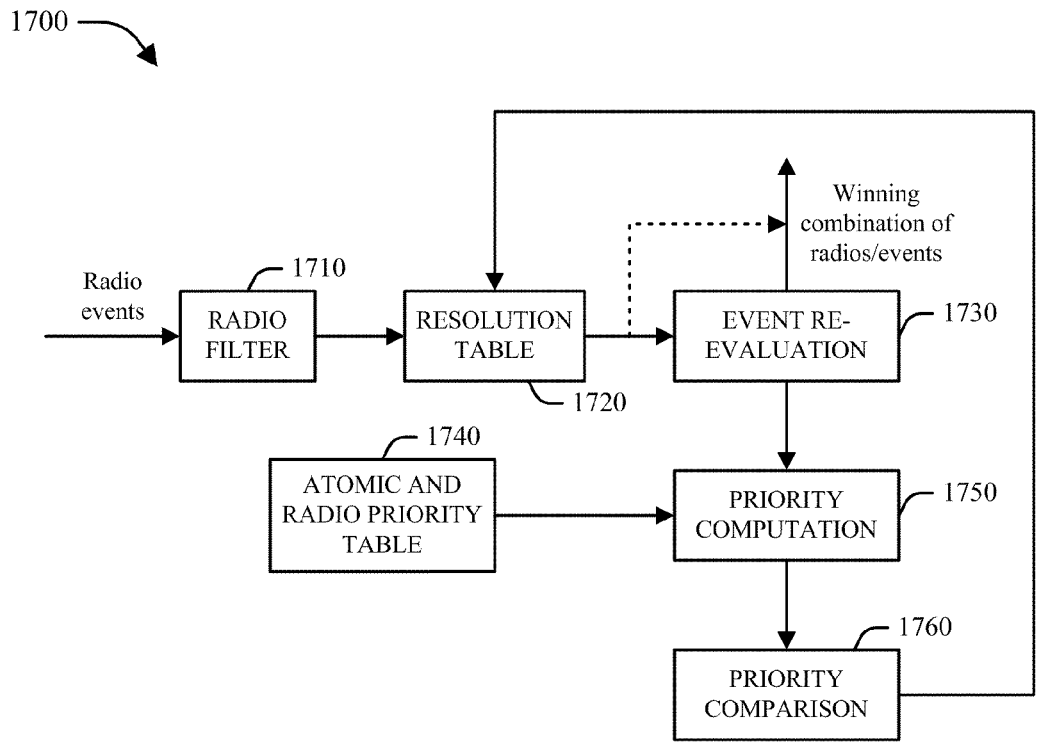

Diagram 1700 in FIG. 17 illustrates additional aspects of an example CxM implementation. As shown in diagram 1700, radio events can initially be processed by a radio filter 1710, which can identify groups or clusters of radios that can potentially interfere directly and/or indirectly. Next, a resolution table 1720 can be utilized to identify various parameters of the received events (e.g., transmit power, frequency subbands, receive power, tolerated interference, etc.) to determine whether the respective events can coexist.

Based on the operation of the resolution table 1720, an event re-evaluation block 1730 can then determine whether a highest priority (or "winning") combination of radios and/or events exists. If such a combination does not exist, priority computation block 1750 can determine relative priorities associated with events and/or groups of events. In one example, priority computation block 1750 can leverage an atomic and radio priority table 1740, which can be implemented as a table per radio carrying priorities of atomic events and another table carrying relative priorities across radios. In an example, both of such tables can be configured by CxM software and can be static over a given CxM software update.

Based on priorities obtained by priority computation block 1750, arbitration can be performed for various combinations of events via priority comparison block 1760. In accordance with one aspect, priority comparison block 1760 can select the highest priority combination of events and provide such information to resolution table 1720 for re-evaluation.

Figure 18:
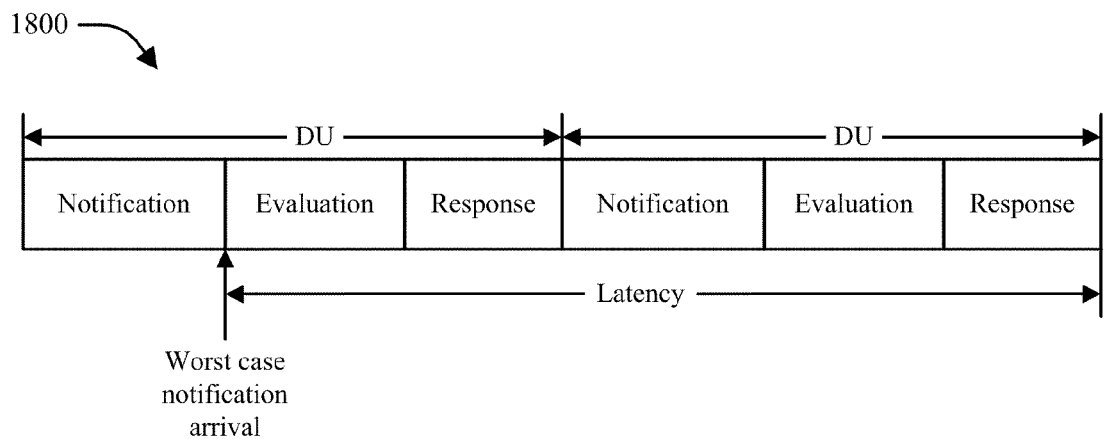
FIG. 18 illustrates operation of an example coexistence manager in time.

Turning to diagram 1800 in FIG. 18, an example timeline for CxM operation is illustrated. In one example, a CxM can operate according to a timeline divided into decision units (DUs) in time, which can be any suitable uniform or non-uniform length (e.g., 100 μs). By way of specific example, a DU can be divided into a notification phase (e.g., 50 μs) where various radios send notifications of imminent events, an evaluation phase (e.g., 30 μs) where notifications are processed, and a response phase (e.g., 20 μs) where commands are provided to various radios and/or other operations are performed based on actions taken in the evaluation phase. In one example, timeline 1800 can have a latency parameter defined by the worst case operation of timeline 1800, e.g., the timing of a response in the case that a notification is obtained from a given radio immediately following termination of the notification phase in a given DU.

With respect to the above description, one of ordinary skill in the art can appreciate that various aspects described above can be implemented by hardware, software, firmware, middleware, microcode, or any combination thereof. When the systems and/or methods are implemented in software, firmware, middleware or microcode, program code or code segments, they can be stored in a machine-readable medium, such as a memory or storage device. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

Moreover, those of skill in the art can appreciate that information and signals can be represented using any of a variety of different technologies and techniques. For example, data, instructions, commands, information, signals, bits, symbols, and/or chips that may be referenced throughout the above description can be represented by voltages, currents, electromagnetic waves, magnetic fields or particles, optical fields or particles, or any combination thereof.

In addition, it is to be understood that the steps of the various methods and/or algorithms as described in connection with the disclosure above can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An example storage medium can be coupled to a processor such that the processor can read information from, and write information to, the storage medium. In the alternative, the storage medium can be integral to the processor. The processor and the storage medium can reside in an ASIC, which in turn can reside in a user terminal and/or in any other suitable location. Alternatively, processor and the storage medium can reside as discrete components in a user terminal.

The above description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is instead to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying a set of radios of a user equipment;
   identifying sets of candidate parameters for operation of respective identified radios, the sets of candidate parameters comprising input parameters for substantially all combinations of input communication events associated with the set of radios including a plurality of input communication events within one radio of the set of radios;
   binning respective input parameters based on one or more predetermined radio operation quality level parameters;
   obtaining output parameters for the respective identified radios from respective binned input parameters;
   selecting a respective set of parameters from the identified sets of candidate parameters based at least in part on the plurality of input communication events within the one radio of the set of radios, in which at least a portion of the identified radios can operate substantially simultaneously on the user equipment according to the output parameters associated with the selected set of parameters;
   constructing a graph at least in part by representing respective identified radios as clusters of nodes, wherein nodes in respective clusters correspond to candidate parameter configurations for the respective identified radios, and generating edges between respective potentially conflicting radios that correspond to parameters with which the respective radios can operate substantially simultaneously; and selecting a set of identified candidate parameters corresponding to a set of edges in the graph that connect nodes corresponding to substantially all potentially conflicting identified radios in the graph.

2. The method of claim 1, wherein the selecting comprises selecting respective sets of parameters based on which at least a portion of the identified radios can operate substantially simultaneously at a predefined quality level defined as a function of one or more of receiver interference level or acceptable power backoff.

3. The method of claim 1, wherein the sets of candidate parameters comprise one or more of frequency sub-band parameters, power parameters, or radio frequency (RF) Knob settings.

4. The method of claim 1, wherein the selecting a set of identified candidate parameters comprises:
eliminating respective nodes in the graph corresponding to parameters for respective corresponding radios that do not have at least one parameter edge to substantially all radios that potentially conflict with the respective corresponding radios;
iterating the eliminating until the eliminating results in elimination of substantially no nodes, thereby obtaining a remaining set of nodes; and
selecting a set of identified candidate parameters corresponding to a set of edges in the graph that connect respective nodes in the remaining set of nodes.

5. The method of claim 1, wherein the selecting a set of identified candidate parameters comprises performing priority-based iteration upon determining that a set of edges in the graph that connect substantially all potentially conflicting radios in the graph does not exist.

6. The method of claim 1, wherein the constructing a graph comprises:
constructing nodes corresponding to transmit power parameters of respective transmitter radios and reported tolerable interference levels of respective receiver radios; and
constructing edges that connect respective nodes corresponding to transmit power parameters to respective nodes corresponding to tolerable interference levels that the transmit power parameters are capable of satisfying.

7. The method of claim 6, wherein the selecting further comprises adjusting the tolerable interference levels of the respective receiver radios to account for interference from multiple transmitter radios.

8. The method of claim 7, wherein the adjusting comprises decreasing tolerable interference levels of the respective receiver radios for respective transmitter radios to account for combined interference impact of the respective transmitter radios.

9. The method of claim 8, wherein the decreasing comprises decreasing tolerable interference levels of the respective receiver radios by variable amounts at the respective transmitter radios as a function of radio conditions of the respective transmitter radios.

10. The method of claim 7, wherein:
the adjusting further comprises determining a number of transmitter radios connected to respective receiver radios and partitioning interference among respective transmitter radios connected to respective receiver radios by scaling down interference targets associated with the respective receiver radios by the number of transmitter radios connected to the respective receiver radios; and
the selecting further comprises determining a maximum transmit power for communication from respective transmitter radios to respective connected receiver radios based on receiver interference targets, transmitter frequency sub-bands, or receiver frequency sub-bands and selecting a minimum of determined maximum transmit powers for the respective transmitter radios as power resolutions for the respective transmitter radios.

11. The method of claim 10, wherein:
the adjusting further comprises determining interference caused by respective transmitter radios connected to respective receiver radios based on the power resolutions for the respective transmitter radios and partitioning interference for the respective receiver radios in proportion to the interference caused by the respective transmitter radios connected to the respective receiver radios; and
the selecting further comprises repeating the determining a maximum transmit power and the selecting a minimum of determined maximum transmit powers for the respective transmitter radios upon completion of the partitioning interference for the respective receiver radios.

12. The method of claim 10, wherein the selecting further comprises:
identifying one or more dominant interfering transmitter radios for respective receiver radios; and
performing the selecting only for respective identified dominant interfering transmitter radios for the respective receiver radios.

13. The method of claim 1, wherein the constructing a graph comprises:
constructing nodes corresponding to transmit power parameters of respective transmitter radios and combinations of transmit powers that are suitable for meeting respective tolerable interference levels of respective receiver radios; and
constructing edges that connect respective nodes corresponding to combined transmit power parameters to respective nodes corresponding to tolerable interference levels that the combined transmit power parameters are capable of satisfying.

14. The method of claim 1, wherein the constructing a graph comprises:
constructing nodes corresponding to RF Knob settings of respective radios; and
constructing edges that connect respective nodes corresponding to compatible RF Knob settings for potentially conflicting radios.

15. The method of claim 1, wherein the constructing a graph comprises:
constructing nodes corresponding to frequency sub-bands usable by respective radios; and
constructing edges that connect respective nodes corresponding to frequency sub-bands for which a power level can be chosen to meet a predefined interference target between a set of corresponding potentially conflicting radios.

16. The method of claim 1, wherein the selecting a set of identified candidate parameters comprises:
identifying a plurality of sets of identified candidate parameters corresponding to sets of edges in the graph that connect nodes corresponding to substantially all potentially conflicting identified radios in the graph; and selecting a set of identified candidate parameters from the plurality of sets of identified candidate parameters using a cost function.

17. The method of claim 16, wherein the cost function is defined according to at least one of power consumption or optimal radio performance.

18. A wireless communications apparatus, comprising:
a memory that stores data relating to a set of potentially conflicting radios of the apparatus; and
a processor configured:
to determine sets of candidate operating parameters for respective potentially conflicting radios, the sets of candidate operating parameters comprising input parameters for substantially all combinations of input communication events associated with the set of potentially conflicting radios including a plurality of input communication events within one radio of the potentially conflicting radios,
to bin respective input parameters based on one or more predetermined radio operation quality level parameters,
to obtain output parameters for respective potentially conflicting radios from respective binned input parameters,
to select respective candidate operating parameters based at least in part on the plurality of input communication events within the one radio of the potentially conflicting radios, in which at least a portion of the potentially conflicting radios can operate substantially simultaneously on the apparatus according to the output parameters associated with the selected operating parameters;
to construct a graph at least in part by representing respective potentially conflicting radios as clusters of nodes comprising nodes that correspond to respective candidate parameter configurations for corresponding potentially conflicting radios and generating edges between nodes corresponding to parameters with which respective potentially conflicting radios associated with the nodes can operate substantially simultaneously, and
to select respective candidate operating parameters corresponding to a set of edges in the graph that connect nodes representing substantially all potentially conflicting identified radios.

19. The wireless communications apparatus of claim 18, wherein the processor is further configured to select respective candidate operating parameters for the respective potentially conflicting radios based on which at least a portion of the potentially conflicting radios can operate substantially simultaneously at a predefined quality level defined as a function of one or more of interference targets or acceptable power backoff.

20. The wireless communications apparatus of claim 18, wherein the candidate operating parameters comprise one or more of frequency sub-band parameters, power parameters, or radio frequency (RF) Knob settings.

21. The wireless communications apparatus of claim 18, wherein the processor is further configured to discard respective nodes in the graph corresponding to operating parameters for respective corresponding radios that do not have at least one parameter edge to nodes associated with substantially all radios that potentially conflict with the respective corresponding radios, to iterate discarding until the discarding results in elimination of substantially no nodes, and to select candidate operating parameters from among a set of edges in the graph that connect respective non-discarded nodes.

22. The wireless communications apparatus of claim 18, wherein the processor is further configured to perform priority-based iteration upon determining that a set of edges in the graph that connect substantially all potentially conflicting radios represented in the graph does not exist.

23. The wireless communications apparatus of claim 18, wherein the processor is further configured to construct the graph at least in part by generating nodes corresponding to transmit power parameters of respective transmitter radios and reported tolerable interference levels of respective receiver radios and generating edges that connect respective nodes corresponding to tolerable interference levels to respective nodes representing transmit power parameters that satisfy the tolerable interference levels.

24. The wireless communications apparatus of claim 23, wherein the processor is further configured to adjust the tolerable interference levels of the respective receiver radios to account for interference from multiple transmitter radios.

25. The wireless communications apparatus of claim 24, wherein the processor is further configured to decrease tolerable interference levels of respective receiver radios with respect to transmitter radios connected to the respective receiver radios to account for combined interference impact of the transmitter radios.

26. The wireless communications apparatus of claim 25, wherein the processor is further configured to decrease tolerable interference levels of respective receiver radios by variable amounts with respect to transmitter radios connected to the respective receiver radios as a function of radio conditions of the transmitter radios.

27. The wireless communications apparatus of claim 24, wherein the processor is further configured to determine a number of transmitter radios connected to respective receiver radios; to partition interference among respective transmitter radios connected to the respective receiver radios by scaling down interference targets associated with the respective receiver radios by the number of transmitter radios connected to the respective receiver radios; to determine a maximum transmit power for communication from respective transmitter radios to respective connected receiver radios based on receiver interference targets, transmitter frequency sub-bands, or receiver frequency sub-bands; and to select a minimum of determined maximum transmit powers for the respective transmitter radios as power resolutions for the respective transmitter radios.

28. The wireless communications apparatus of claim 27, wherein the processor is further configured to determine interference caused by transmitter radios connected to respective receiver radios based on the power resolutions for the respective transmitter radios, to re-partition interference for the respective receiver radios in proportion to the interference caused by the transmitter radios connected to the respective receiver radios, to determine updated maximum transmit powers for the respective transmitter radios based on re-partitioned interference for the respective receiver radios, and to select a minimum of updated maximum transmit powers for the respective transmitter radios as updated power resolutions for the respective transmitter radios.

29. The wireless communications apparatus of claim 27, wherein the processor is further configured to identify one or more dominant interfering transmitter radios for respective receiver radios and to select power resolutions only for respectively identified dominant interfering transmitter radios for the respective receiver radios.

30. The wireless communications apparatus of claim 18, wherein the processor is further configured to construct the graph at least in part by generating nodes corresponding to transmit power parameters of respective transmitter radios and combinations of transmit powers that are suitable for meeting respective tolerable interference levels of respective receiver radios and generating edges that connect nodes corresponding to combined transmit power parameters to respective nodes corresponding to tolerable interference levels that the combined transmit power parameters are capable of satisfying.

31. The wireless communications apparatus of claim 18, wherein the processor is further configured to construct the graph at least in part by generating nodes corresponding to RF Knob settings of respective radios and generating edges that connect respective nodes corresponding to compatible RF Knob settings for pairs of potentially conflicting radios.

32. The wireless communications apparatus of claim 18, wherein the processor is further configured to construct the graph at least in part by generating nodes corresponding to frequency sub-bands usable by respective radios and generating edges that connect respective nodes corresponding to frequency sub-bands for which a power level can be chosen to meet a predefined interference target between respective pairs of potentially conflicting radios.

33. The wireless communications apparatus of claim 18, wherein the processor is further configured to identify a plurality of sets of candidate operating parameters for respective potentially conflicting radios corresponding to sets of edges in the graph that connect nodes corresponding to substantially all potentially conflicting radios and to select a set of candidate operating parameters using a cost function.

34. The wireless communications apparatus of claim 33, wherein the cost function is defined according to at least one of power consumption or optimal radio performance.

35. An apparatus, comprising:
    means for identifying a plurality of usable radios of the apparatus and respective sets of candidate parameters for operation of the plurality of usable radios, the sets of candidate parameters comprising input parameters for substantially all combinations of input communication events associated with the plurality of radios including a plurality of input communication events within one radio of the plurality of usable radios;
    means for binning respective input parameters based on one or more predetermined radio operation quality level parameters;
    means for obtaining output parameters for the respective identified radios from respective binned input parameters;
    means for selecting parameters for operation of the plurality of usable radios from the respective sets of candidate parameters based at least in part on the plurality of input communication events within the one radio of the plurality of usable radios, to enable substantial coexistence between the plurality of usable radios on the apparatus based on output parameters associated with the selected parameters for operation;
    means for constructing a graph at least in part by representing respective usable radios as clusters of nodes, the clusters of nodes respectively comprising nodes that correspond to respective candidate parameter configurations for corresponding radios, and generating edges between nodes corresponding to parameters for which respective usable radios associated with the nodes can substantially coexist; and
    means for selecting parameters for operation of the plurality of usable radios corresponding to a set of edges in the graph that connect nodes representing substantially all potentially conflicting usable radios in the graph.

36. The apparatus of claim 35, wherein the means for selecting comprises means for selecting respective parameters based on which at least a portion of the plurality of usable radios can operate substantially simultaneously at a predefined quality level defined as a function of one or more of receiver interference level or acceptable power backoff.

37. The apparatus of claim 35, wherein the means for selecting comprises means for selecting one or more of frequency sub-band parameters, power parameters, or radio frequency (RF) Knob settings for operation of the plurality of usable radios.

38. The apparatus of claim 35, wherein the means for selecting further comprises:
    means for discarding respective nodes in the graph corresponding to parameters for operation of respective radios that do not have at least one parameter edge to nodes associated with substantially all radios that potentially conflict with the respective corresponding radios;
    means for iterating execution of the means for discarding until execution of the means for discarding results in elimination of substantially no nodes; and
    means for selecting parameters for operation of the plurality of usable radios from among a set of edges in the graph that connect respective non-discarded nodes.

39. The apparatus of claim 35, wherein the means for selecting further comprises means for conducting priority-based iteration upon determining that a set of edges in the graph that connect substantially all potentially conflicting radios in the graph does not exist.

40. The apparatus of claim 35, wherein the means for constructing a graph comprises:
    means for generating respective nodes corresponding to transmit power parameters of respective transmitter radios and reported tolerable interference levels of respective receiver radios; and
    means for generating edges that connect respective nodes representing tolerable interference levels to respective nodes representing transmit power parameters that satisfy the tolerable interference levels.

41. The apparatus of claim 40, wherein the means for selecting further comprises means for adjusting the tolerable interference levels of the respective receiver radios to account for interference from multiple transmitter radios.

42. The apparatus of claim 41, wherein the means for adjusting comprises means for decreasing tolerable interference levels of respective receiver radios with respect to transmitter radios connected to the respective receiver radios to account for combined interference impact of the transmitter radios.

43. The apparatus of claim 42, wherein the means for decreasing comprises means for decreasing tolerable interference levels of respective receiver radios by variable amounts with respect to transmitter radios connected to the respective receiver radios as a function of radio conditions of the transmitter radios.

44. The apparatus of claim 41, wherein:
    the means for adjusting comprises means for determining a number of transmitter radios connected to respective receiver radios and means for partitioning interference among respective transmitter radios connected to the respective receiver radios by scaling down tolerable interference levels associated with the respective receiver radios by the number of transmitter radios connected to the respective receiver radios; and
    the means for selecting further comprises means for determining a maximum transmit power for respective transmitter radios based on scaled tolerable interference levels of connected receiver radios, transmitter frequency sub-bands, or receiver frequency sub-bands and means for selecting a minimum of determined maximum transmit powers for the respective transmitter radios as power resolutions for the respective transmitter radios.

45. The apparatus of claim 44, wherein:
the means for adjusting further comprises means for determining interference caused by transmitter radios connected to respective receiver radios based on the power resolutions for the respective transmitter radios and means for re-partitioning interference for the respective receiver radios in proportion to the interference caused by the transmitter radios connected to the respective receiver radios; and
the means for selecting further comprises means for determining updated maximum transmit powers for the respective transmitter radios based on re-partitioned interference for the respective receiver radios and means for selecting a minimum of updated maximum transmit powers for the respective transmitter radios as updated power resolutions for the respective transmitter radios.

46. The apparatus of claim 44, wherein the means for selecting further comprises:
means for identifying one or more dominant interfering transmitter radios for respective receiver radios; and
means for selecting power resolutions only for respectively identified dominant interfering transmitter radios for the respective receiver radios.

47. The apparatus of claim 35, wherein the means for constructing a graph comprises:
means for generating nodes corresponding to transmit power parameters of respective transmitter radios and combinations of transmit powers that are suitable for meeting respective tolerable interference levels of respective receiver radios; and
means for generating edges that connect nodes corresponding to combined transmit power parameters to respective nodes corresponding to tolerable interference levels that the combined transmit power parameters are capable of satisfying.

48. The apparatus of claim 35, wherein the means for constructing a graph comprises:
means for generating nodes corresponding to RF Knob settings of respective usable radios; and
means for generating edges that connect respective nodes corresponding to compatible RF Knob settings for respective pairs of potentially conflicting radios.

49. The apparatus of claim 35, wherein the means for constructing a graph comprises:
means for generating nodes corresponding to frequency sub-bands on which respective usable radios are configured for operation; and
means for generating edges that connect respective nodes corresponding to frequency sub-bands for which a power level can be chosen to enable substantial coexistence between respective pairs of potentially conflicting radios.

50. The apparatus of claim 35, wherein the means for selecting further comprises:
means for identifying a plurality of candidate parameters for operation of respective usable radios corresponding to sets of edges in the graph that connect nodes corresponding to substantially all potentially conflicting usable radios; and
means for selecting candidate parameters from among the plurality of candidate parameters according to a cost function.

51. The apparatus of claim 50, wherein the cost function is defined according to at least one of power consumption or optimal radio performance.

52. A computer program product, comprising:
a non-transitory computer-readable medium, comprising:
code for causing a computer to identify a set of potentially conflicting radios of a user equipment;
code for causing a computer to determine candidate operating parameters for respective potentially conflicting radios, the sets of candidate operating parameters comprising input parameters for substantially all combinations of input communication events associated with the set of potentially conflicting radios including a plurality of input communication events within one radio of the set of potentially conflicting radios;
code for binning respective input parameters based on one or more predetermined radio operation quality level parameters;
code for obtaining output parameters for respective potentially conflicting radios from respective binned input parameters;
code for causing a computer to select respective candidate operating parameters based at least in part on the plurality of input communication events within the one radio of the set of potentially conflicting radios, in which at least a portion of the potentially conflicting radios can operate substantially simultaneously on the user equipment according to the output parameters associated with the selected operating parameters;
code for constructing a graph at least in part by representing respective usable radios as clusters of nodes, the clusters of nodes respectively comprising nodes that correspond to respective candidate parameter configurations for corresponding radios, and generating edges between nodes corresponding to parameters for which respective usable radios associated with the nodes can substantially coexist; and
code for selecting parameters for operation of the plurality of usable radios corresponding to a set of edges in the graph that connect nodes representing substantially all potentially conflicting usable radios in the graph.

53. An integrated circuit that executes a set of machine-executable instructions, the set of machine-executable instructions comprising:
identifying a plurality of usable radios within a user equipment and respective sets of candidate parameters for operation of the plurality of usable radios, the sets of candidate parameters comprising input parameters for substantially all combinations of input communication events associated with the set of radios including a plurality of input communication events within one radio of the plurality of usable radios;
selecting parameters for operation of the plurality of usable radios from the respective sets of candidate parameters based at least in part on the plurality of input communication events within the one radio of the plurality of usable radios, to enable substantial coexistence between the plurality of usable radios;
constructing a graph at least in part by representing respective identified radios as clusters of nodes, wherein nodes in respective clusters correspond to candidate parameter configurations for the respective identified radios, and generating edges between respective potentially conflicting radios that correspond to parameters with which the respective radios can operate substantially simultaneously; and selecting a set of identified candidate parameters corresponding to a set of edges in the graph that connect nodes corresponding to substantially all potentially conflicting identified radios in the graph.

\* \* \* \* \*